United States Patent
Hundemer et al.

(10) Patent No.: US 10,412,142 B2
(45) Date of Patent: Sep. 10, 2019

(54) VIDEO-PRODUCTION SYSTEM WITH SOCIAL-MEDIA FEATURES

(71) Applicant: Tribune Broadcasting Company, LLC, Chicago, IL (US)

(72) Inventors: Hank J. Hundemer, Bellevue, KY (US); Dana Lasher, Morgan Hill, CA (US)

(73) Assignee: Tribune Broadcasting Company, LLC, Chicago, IL (US)

( * ) Notice: Subject to any disclaimer, the term of this patent is extended or adjusted under 35 U.S.C. 154(b) by 296 days.

(21) Appl. No.: 15/211,252

(22) Filed: Jul. 15, 2016

(65) Prior Publication Data

US 2017/0019452 A1    Jan. 19, 2017

Related U.S. Application Data

(60) Provisional application No. 62/242,593, filed on Oct. 16, 2015, provisional application No. 62/194,171, filed on Jul. 17, 2015.

(51) Int. Cl.
*G06F 15/16* (2006.01)
*H04L 29/06* (2006.01)
(Continued)

(52) U.S. Cl.
CPC .......... *H04L 65/607* (2013.01); *G06F 3/0482* (2013.01); *G06F 3/0486* (2013.01); *G06F 17/248* (2013.01); *G11B 27/00* (2013.01); *H04L 51/10* (2013.01); *H04L 51/32* (2013.01); *H04L 65/4076* (2013.01); *H04L 65/602* (2013.01); *H04L 65/604* (2013.01); *H04L 67/02* (2013.01);
(Continued)

(58) Field of Classification Search
CPC ....... H04L 65/607; H04L 51/10; H04L 51/32; G06F 3/0482; G06F 3/0486
USPC ....................................................... 709/231
See application file for complete search history.

(56) References Cited

U.S. PATENT DOCUMENTS 9,049,386 B1    6/2015  Hundemer
9,306,989 B1    4/2016  Jayaram
(Continued)

FOREIGN PATENT DOCUMENTS

WO    2013163742 A1    11/2013
WO    2015038516 A1    3/2015

OTHER PUBLICATIONS https://en.wikipedia.org/wiki/Meerkat_(app); Wikipedia Article on Meerkat (app); published May 29, 2015; retrieved Sep. 28, 2016.
(Continued)

*Primary Examiner* — Alan S Chou
(74) *Attorney, Agent, or Firm* — McDonnell Boehnen Hulbert & Berghoff LLP

(57) ABSTRACT

In one aspect, a method includes (i) accessing, by a computing system, a social media (SM) platform, (ii) selecting, by the computing system, a SM content item published on the SM platform, (iii) responsive to selecting the SM content item, the computing system receiving an account identifier and a timestamp each corresponding to the selected SM content item, (iv) using, by the computing system, the received account identifier and timestamp to retrieve the SM content item from the SM platform, and (v) integrating, by the computing system, the retrieved SM content item into a video program.

21 Claims, 22 Drawing Sheets

(51) Int. Cl.

| | | |
|---|---|---|
| *H04L 29/08* | (2006.01) | |
| *H04L 12/58* | (2006.01) | |
| *G06F 3/0486* | (2013.01) | |
| *G06F 17/24* | (2006.01) | |
| *H04N 21/262* | (2011.01) | |
| *H04N 21/84* | (2011.01) | |
| *H04N 21/234* | (2011.01) | |
| *H04N 21/2665* | (2011.01) | |
| *G06F 3/0482* | (2013.01) | |
| *H04N 21/854* | (2011.01) | |
| *G11B 27/00* | (2006.01) | |

(52) U.S. Cl.
CPC .............. *H04L 67/10* (2013.01); *H04L 67/18* (2013.01); *H04L 67/306* (2013.01); *H04L 67/42* (2013.01); *H04N 21/23424* (2013.01); *H04N 21/262* (2013.01); *H04N 21/2665* (2013.01); *H04N 21/84* (2013.01); *H04N 21/854* (2013.01)

(56) References Cited

U.S. PATENT DOCUMENTS

| | | |
|---|---|---|
| 2002/0109710 A1 | 8/2002 | Holtz et al. |
| 2006/0277457 A1 | 12/2006 | Salkind et al. |
| 2008/0134298 A1 | 6/2008 | Nathan et al. |
| 2010/0121849 A1 | 5/2010 | Goeldi |
| 2011/0040760 A1 | 2/2011 | Fleischman et al. |
| 2012/0110429 A1 | 5/2012 | Tzonis et al. |
| 2012/0331496 A1 | 12/2012 | Copertino et al. |
| 2013/0014136 A1 | 1/2013 | Bhatia et al. |
| 2013/0132861 A1 | 5/2013 | Kienzle et al. |
| 2013/0212493 A1 | 8/2013 | Krishnamurthy |
| 2013/0263018 A1* | 10/2013 | Xiong ................. H04N 21/458 715/753 |
| 2013/0268962 A1 | 10/2013 | Snider et al. |
| 2013/0304818 A1 | 11/2013 | Brumleve et al. |
| 2014/0040243 A1 | 2/2014 | Rubinstein et al. |
| 2014/0040371 A1 | 2/2014 | Gurevich et al. |
| 2014/0068677 A1 | 3/2014 | Gil et al. |
| 2014/0108373 A1 | 4/2014 | Abrahami et al. |
| 2014/0125703 A1 | 5/2014 | Roveta et al. |
| 2014/0280564 A1 | 9/2014 | Darling et al. |
| 2015/0026712 A1 | 1/2015 | Snider et al. |
| 2015/0046842 A1 | 2/2015 | Barr et al. |
| 2015/0100586 A1 | 4/2015 | Caruso |
| 2015/0121423 A1 | 4/2015 | Phipps et al. |
| 2015/0143405 A1* | 5/2015 | Hogan ............... H04N 21/8146 725/32 |
| 2015/0163354 A1 | 6/2015 | Nezarati et al. |
| 2016/0099856 A1 | 4/2016 | Ramaswamy |
| 2017/0024791 A1 | 1/2017 | Klinger |
| 2017/0243615 A1* | 8/2017 | Tabak .................... G11B 27/10 |

OTHER PUBLICATIONS https://en.wikipedia.org/wiki/Periscope_(app); Wikipedia Article on Periscope (app); published May 26, 2015; retrieved Sep. 28, 2016.
https://abouttagboard.com/live; Tagboard Live Webpage; published Mar. 15, 2015; retrieved Sep. 28, 2016.
https://techcrunch.com/2013/11/25/tagboard-2-0/; Tagboard Revamps Its Cross-Platform Hashtag Aggregator; Anthony Ha; published Nov. 25, 2013; retrieved Sep. 28, 2016.
https://beta.stringr.com; Stringr Homepage; published Apr. 13, 2015; retrieved Sep. 28, 2016.
https://www.vidpresso.com/social; Vidpresso Social Homepage; published Jun. 27, 2015; retrieved Sep. 28, 2016.
https://techcrunch.com/2013/04/03/vidpresso-adds-photo-touchscreen-support-to-help-bring-twitter-to-tv/; Vidpresso Adds Photo, Touchscreen Support to Help Bring Twitter to TV; Ryan Lawler; published Apr. 3, 2013; retrieved Sep. 28, 2016.
https://techcrunch.com/2012/05/07/vidpresso-wants-to-help-tv-stations-put-your-tweets-and-facebook-comments-on-air/; Vidpresso Wants to Help TV Stations Put Your Tweets and Facebook Comments on Air; Frederic Lardinois; published May 7, 2012; retrieved Sep. 28, 2016.
https://techcrunch.com/2014/03/03/vidpresso-ads/; Ads to Broadcast TV; Ryan Lawler; published Mar. 3, 2014; retrieved Sep. 28, 2016.
Search report and written opinion issued by the Korean Intellectual Property Office for Int'l Pat. Appl. No. PCT/US2016/042456, dated Oct. 24, 2016 (15 pages).
Search report and written opinion issued by the Korean Intellectual Property Office for Int'l Pat. Appl. No. PCT/US2016/042461, dated Oct. 20, 2016 (14 pages).
Co-Pending U.S. Appl. No. 15/211,243, filed Jul. 15, 2016.
Co-Pending U.S. Appl. No. 15/211,258, filed Jul. 15, 2016.
Co-Pending U.S. Appl. No. 15/211,280, filed Jul. 15, 2016.
VizRT Official: IBC 2014—VizRT Social TV, Youtube, Sep. 16, 2014 (Sep. 16, 2014), pp. 1-2, XP054978782, Retrieved from the Internet: URL:https://www.youtube.com/watch?v=sLp32BVGbCE.
Lindsay Kolowich, "The Ultimate Guide to Embedding Social Meida Posts on Your Website", Jun. 25, 2014, HubSpot, https://blog.hubspot.com/marketing/embed-social-media-posts-guide (Jun. 4, 2018).
Advisory Action dated Mar. 18, 2019 for U.S. Appl. No. 15/211,243.
Final Office Action dated Nov. 29, 2018 issued in U.S. Appl. No. 15/211,243.

\* cited by examiner

*500*

| Story Title | Video-Segment Identifier | Duration | DVE Identifier |
|---|---|---|---|
| STORY A | VS ID A | 00:02:00:00 | DVE ID A |
| STORY B | VS ID B | 00:01:30:00 | |
| STORY C | | 00:00:30:00 | DVE ID C |
| STORY D | VS ID D | 00:00:30:00 | |
| STORY E | VS ID E | 00:00:30:00 | |
| COMMERCIAL BREAK | | | |
| STORY F | VS ID F | 00:02:00:00 | DVE ID F |
| STORY G | | 00:01:30:00 | DVE ID G |
| STORY H | VS ID H | 00:00:30:00 | |
| STORY I | VS ID I | 00:00:30:00 | |

VIDEO-PRODUCTION SYSTEM WITH SOCIAL-MEDIA FEATURES

CROSS-REFERENCE TO RELATED DISCLOSURES

This disclosure claims priority to (i) U.S. Provisional Patent Application No. 62/194,171, titled "Video Production System with Social Media Features," filed on Jul. 17, 2015, and (ii) U.S. Provisional Patent Application No. 62/242,593, titled "Video Production System with Content-Related Features," filed on Oct. 16, 2015, both of which are hereby incorporated by reference in their entirety.

USAGE AND TERMINOLOGY

In this disclosure, with respect to all reasonable derivatives of such terms, unless otherwise specified and/or unless the particular context clearly dictates otherwise, each usage of "a" or "an" means at least one, and each usage of "the" means the at least one.

BACKGROUND

Unless otherwise specified, the materials described in this section are not prior art to the claims in this disclosure and are not admitted to be prior art by inclusion in this section.

A video-production system (VPS) can generate and/or output a video program (e.g., a news program) in the form of video content. The VPS can include various components to facilitate this. For example, the VPS can include a scheduling system, which can create and/or edit a program schedule, perhaps based on input received from a user (e.g., a producer or technical director) via a user interface. Further, the VPS can include a sequencing system, which can process records in the program schedule, and based on the processed records, control one or more components of the VPS to facilitate generating and/or outputting the video program.

SUMMARY

In a first aspect, the disclosure provides a method that includes (i) accessing, by a computing system, a social media (SM) platform, (ii) selecting, by the computing system, a SM content item published on the SM platform, (iii) responsive to selecting the SM content item, the computing system receiving an account identifier and a timestamp each corresponding to the selected SM content item, (iv) using, by the computing system, the received account identifier and timestamp to retrieve the SM content item from the SM platform, and (v) integrating, by the computing system, the retrieved SM content item into a video program.

In a second aspect, the disclosure provides a non-transitory computer-readable medium having stored thereon, program instructions, that when executed by a processor, cause a computing system to perform a set of acts that includes (i) accessing, by the computing system, a SM platform, (ii) selecting, by the computing system, a SM content item published on the SM platform, (iii) responsive to selecting the SM content item, the computing system receiving an account identifier and a timestamp each corresponding to the selected SM content item, and (iv) using, by the computing system, the received account identifier and timestamp to retrieve the SM content item from the SM platform.

In a third aspect, the disclosure provides a computing system configured for performing a set of acts that includes (i) accessing, by the computing system, a SM platform, (ii) selecting, by the computing system, a SM content item published on the SM platform, (iii) responsive to selecting the SM content item, the computing system receiving an account identifier and a timestamp each corresponding to the selected SM content item, and (iv) using, by the computing system, the received account identifier and timestamp to retrieve the SM content item from the SM platform.

BRIEF DESCRIPTION OF THE DRAWINGS

FIG. 5 is a simplified illustration of an example program schedule.

FIG. 9B is a simplified illustration of another example display screen of a SM system.

FIG. 9C is a simplified illustration of another example display screen of a SM system.

DETAILED DESCRIPTION

I. Overview

Figure 1:
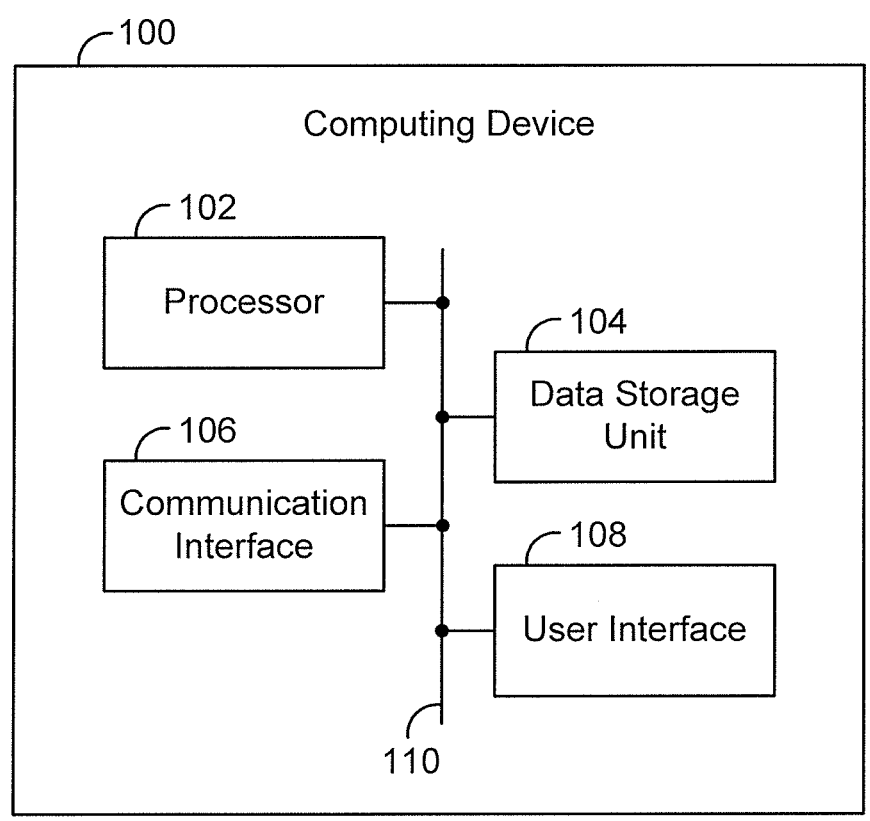
FIG. 1 is a simplified block diagram of an example computing device.

Technology has changed how information is stored, published, searched, and consumed. Among other things, social media has become a prominent and influential source of news and entertainment content. Indeed, social media platforms are more and more often a news-breaking source of information. It may thus be beneficial for media content providers to incorporate social media content items into video broadcasts.

However, media content providers can encounter a number of technological challenges that make it difficult to incorporate social media content items into a video program. For example, acquiring and preparing social media content items for a video program is generally a time consuming and labor-intensive process using conventional computing devices and technology platforms. This can be particularly problematic in the context of news broadcasts in which it may be beneficial to quickly identify, acquire, and integrate in a video program news-worthy information published on social media platforms.

The systems and methods of the present disclosure can overcome these and other technological challenges. In particular, the systems and methods of the present disclosure provide technological solutions that allow for timely and efficient identification, acquisition, and integration of social media content items into a video program. For example, the systems and methods can facilitate identifying social media content items of interest on social media platforms, which are generally information-over-loaded environments. As another example, the systems and methods can provide a user interface that facilitates automated social media content retrieval to rapidly and efficiently acquire social media content items of interest. In some instances, the systems and methods can facilitate real-time acquisition and integration of social media content items into a video program. Numerous other example benefits will be apparent from the example systems and methods described below.

In line with the discussion above, this disclosure provides a VPS that can integrate a social media (SM) content item into a video program. A SM content item is a content item that has been published on a SM platform, which is a computer-based tool that allows users to create, share, and/or exchange content (e.g., in the form of text, pictures, and/or videos) in virtual communities on a computer-based network such as the Internet. Examples of SM platforms include TWITTER™, YOUTUBE™, FACEBOOK™, PERISCOPE™ INSTAGRAIVI™, MEERKAT™, LINKEDIN™, and GOOGLE+™.

In one aspect, a VPS can include a SM system, which can obtain a SM content item. A SM system can do this in various ways. In some aspects, a SM system can select a SM content item published on a SM platform, perhaps based on input received from a user via a user interface. For instance, a SM system can select a SM content item based on a user dragging and dropping an object (e.g., an image or link) associated with the SM content item from a first window containing a graphical user interface of a SM platform into a second window containing a graphical user interface of the SM system.

In some implementations, responsive to the SM system selecting the SM content item, the SM system can receive a link to the selected SM content item. Using the received link, the SM system can then retrieve the SM content item from a SM platform on which the SM content item is published.

In other implementations, responsive to the SM system selecting the SM content item, the SM system can receive an account identifier (e.g., a username) and a timestamp, both corresponding to the SM content item. Using the account identifier, the SM system can then access a webpage associated with (i) a SM platform on which the SM content item is published and (ii) the account identifier. Using the timestamp, the SM system can then identify the SM content item on the webpage, and retrieve the identified SM content item from the SM platform.

In either case, the SM system can then store the retrieved SM content item in a data storage unit associated with the SM system. This can allow the SM system to later retrieve the SM content item from the data storage unit associated with the SM system, perhaps based on input received from a user via a user interface.

The SM system can also edit a SM content item. The SM system can do this in various ways. In some aspects, the SM system can edit a SM content item to remove vulgarities, personal information, and/or extraneous information that is not suitable or desirable for integration into a video program, perhaps based on input received from a user via a user interface.

A VPS can also include a scheduling system, which can schedule integration of a SM content item into a video program. In some aspects, a scheduling system can select a SM content item, perhaps based on input received from a user via a user interface. For instance, a scheduling system can select a SM content item based on a user dragging and dropping an object associated with the SM content item from a first window containing a graphical user interface of the SM system into a second window containing a graphical user interface of the scheduling system. Responsive to the scheduling system selecting the SM content item, the scheduling system can modify a program schedule such that the schedule includes a reference to the selected SM content item. A scheduling system can also transform a SM content item from a native format into a format suitable for use by the scheduling system (e.g., a Media Object Server (MOS) object).

A VPS can also include a digital-video effect (DVE) system, which can integrate a SM content item into a video program. In some aspects, a DVE system can receive a SM content item, and can execute a DVE, which causes the DVE system to generate video content that includes the received SM content item. The generated video content can serve as or be made part of a video program.

II. Example Architecture

A. Computing Device

FIG. 1 is a simplified block diagram of an example computing device 100. Computing device 100 can perform various acts and/or functions, such as those described in this disclosure (including the accompanying drawings). Computing device 100 can include various components, such as processor 102, data storage unit 104, communication interface 106, and/or user interface 108. These components can be connected to each other (or to another device, system, or other entity) via connection mechanism 110.

In this disclosure, the term "connection mechanism" means a mechanism that facilitates communication between two or more devices, systems, or other entities. A connection mechanism can be a relatively simple mechanism, such as a cable or system bus, or a relatively complex mechanism, such as a packet-based communication network (e.g., the Internet). In some instances, a connection mechanism can include a non-tangible medium (e.g., where the connection is wireless).

Processor 102 can include a general-purpose processor (e.g., a microprocessor) and/or a special-purpose processor (e.g., a digital signal processor (DSP)).

Data storage unit 104 can include one or more volatile, non-volatile, removable, and/or non-removable storage components, such as magnetic, optical, or flash storage, and/or can be integrated in whole or in part with processor 102. Further, data storage unit 104 can take the form of a non-transitory computer-readable storage medium, having stored thereon program instructions (e.g., compiled or non-compiled program logic and/or machine code) that, when executed by processor 102, cause computing device 100 to perform one or more acts and/or functions, such as those described in this disclosure. As such, computing device 100 can be configured to perform one or more acts and/or functions, such as those described in this disclosure. Such program instructions can define and/or be part of a discrete software application. In some instances, computing device 100 can execute program instructions in response to receiving an input, such as from communication interface 106 and/or user interface 108. Data storage unit 104 can also store other types of data, such as those types described in this disclosure.

Communication interface 106 can allow computing device 100 to connect to and/or communicate with another other entity according to one or more protocols. In one example, communication interface 106 can be a wired interface, such as an Ethernet interface or a high-definition serial-digital-interface (HD-SDI). In another example, communication interface 106 can be a wireless interface, such as a cellular or WI-FI interface. Each connection described in this disclosure can be a direct connection or an indirect connection, the latter being a connection that passes through and/or traverses one or more entities, such as such as a router, switcher, or other network device. Likewise, each transmission described in this disclosure can be a direct transmission or an indirect transmission.

User interface 108 can facilitate interaction between computing device 100 and a user of computing device 100, if applicable. As such, user interface 108 can include input components such as a keyboard, a keypad, a mouse, a touch-sensitive panel, a microphone, and/or a camera, and/or output components such as a display device (which, for example, can be combined with a touch-sensitive panel), a sound speaker, and/or a haptic feedback system. More generally, user interface 108 can include hardware and/or software components that facilitate interaction between computing device 100 and the user of the computing device 100.

Computing device 100 can take various forms, such as a workstation, a desktop computer, a laptop, a tablet, a television, a set-top box, and/or a mobile phone.

B. Computing System

Figure 2:
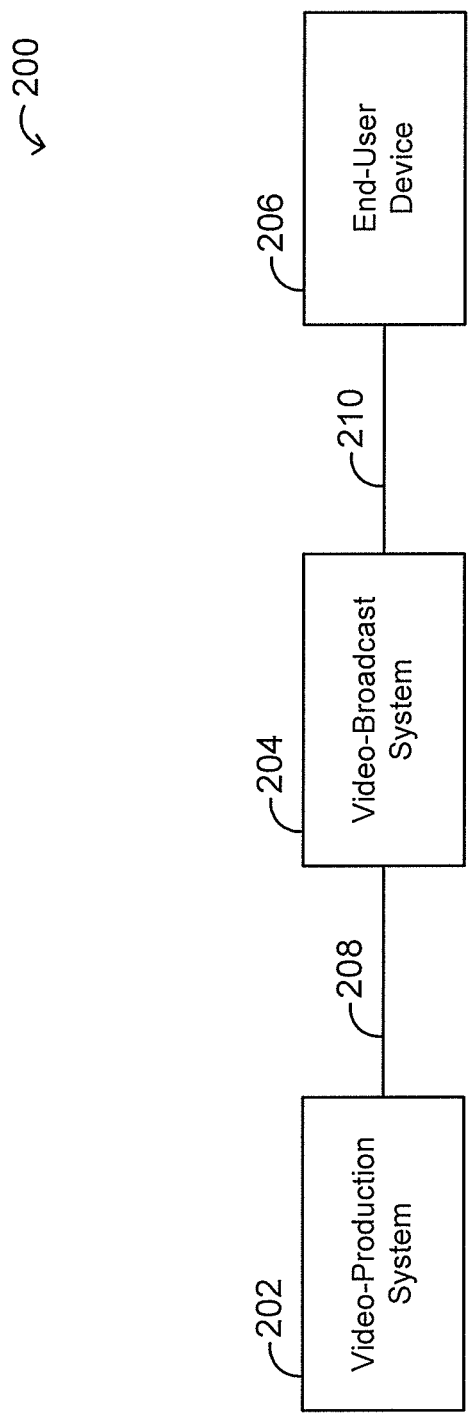
FIG. 2 is a simplified block diagram of an example computing system.

FIG. 2 is a simplified block diagram of an example computing system 200. In this disclosure, a computing system is a system that includes at least one computing device. In some instances, a computing system can include one or more other computing systems.

Computing system 200 can include various components, such as VPS 202, video-broadcast system (VBS) 204, and end-user device 206, each of which can be implemented as a computing system. Computing system 200 can also include connection mechanism 208, which connects VPS 202 with VBS 204; and connection mechanism 210, which connects VBS 204 with end-user device 206.

VPS 202 can generate video content, which can serve as or be made part of a video program. VPS can then transmit the video content to VBS 204. VBS 204 can receive the video content and transmit the video content to end-user device 206 for presentation of the video content to an end user. In practice, VBS 204 can transmit video content to a large number of end-user devices for presentation of the video content to a large number of end users.

Video content can be generated, transmitted, and/or received in various ways and/or according to various standards. For example, the act of generating video content can include generating a video stream representing the video content. As another example, the act of transmitting and/or receiving video content can include transmitting and/or receiving a video stream representing the video content, such as over Internet Protocol (IP) or in accordance with the high-definition serial digital interface (HD-SDI) standard. Also, the act of generating, transmitting, and/or receiving video content can include generating, transmitting, and/or receiving an encoded or decoded version of the video content.

Figure 3:
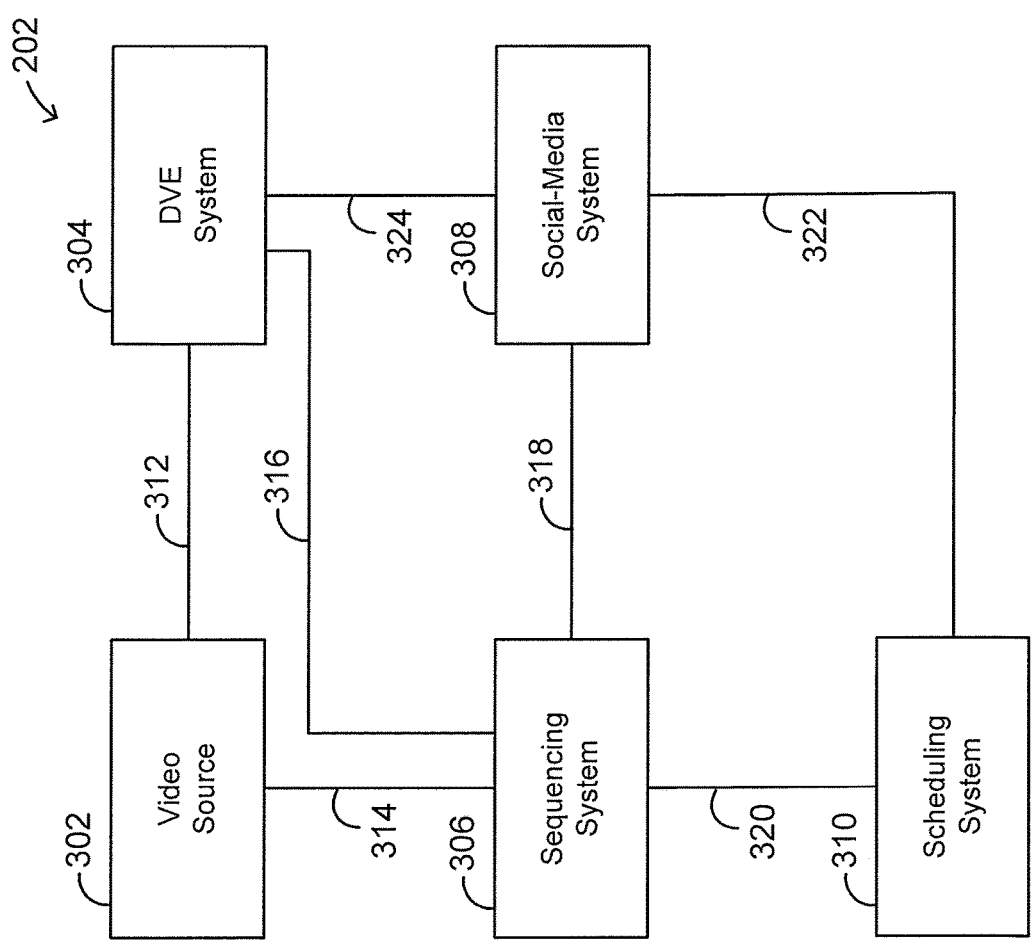
FIG. 3 is a simplified block diagram of another example computing system.

FIG. 3 is a simplified block diagram of an example VPS 202. VPS 202 can include various components, such as video source 302, DVE system 304, sequencing system 306, SM system 308, and scheduling system 310, each of which can be implemented as a computing system. VPS 202 can also include connection mechanism 312, which connects video source 302 with DVE system 304; connection mechanism 314, which connects sequencing system 306 with video source 302; connection mechanism 316, which connects sequencing system 306 with DVE system 304; connection mechanism 318, which connects sequencing system 306 with SM system 308, connection mechanism 320, which connects sequencing system 306 with scheduling system 310; connection mechanism 322, which connects SM system 308 with scheduling system 310; and connection mechanism 324, which connects SM system 308 with DVE system 304.

Video source 302 can generate and/or output video content, and can transmit the video content to DVE system 304. Video source 302 can take various forms, such as a character generator (CG), a video server, a satellite receiver, or a video camera. Video source 302 can also take the form of DVE system 304 or SM system 308, as described below.

A CG can generate video content based on input data. For example, a character generator can receive weather data and then generate video content that includes the weather data. As another example, a character generator can use an ordered set of content items to generate video content that includes the content items in the specified order. This type of generated video content is sometimes referred to in the industry as a "ticker." The content items can include various types of content, such as text and/or images. The ordered set of content items can be stored in various forms, such as in the form of an extended markup Language (XML) file. An example CG is VizRT Trio/VizRT Engine provided by Viz Rt™ of Bergen, Norway. Another example CG is the CasparCG developed and distributed by the Swedish Broadcasting Corporation (SVT).

A video server can store, retrieve, and/or output video content. An example video server is the K2 server provided by Grass Valley™ of San Francisco, Calif.

DVE system 304 can execute a DVE, which can cause DVE system 304 to generate and/or output video content. DVE system 304 can then transmit the video content to VBS 204. In one example, DVE system 304 can receive first video content from video source 302, and can execute a DVE, which causes DVE system 304 to generate second video content by modifying the first video content. As such, DVE system 304 can generate video content by modifying other video content.

DVE system 304 can modify video content in various ways, such as by overlaying text, images, video, or other content thereon. For example, DVE system 304 can modify video content by overlaying, on a lower right-hand corner region of the video content, a channel logo. As another example, DVE system 304 can modify video content by overlaying, on a lower-third region of the video content, a text box including text. As yet another example, DVE system 304 can modify video content by overlaying, on the video content, a SM content item. As another example, DVE system 304 can modify video content by scaling or re-positioning the video content or a portion thereof.

Figure 4A:
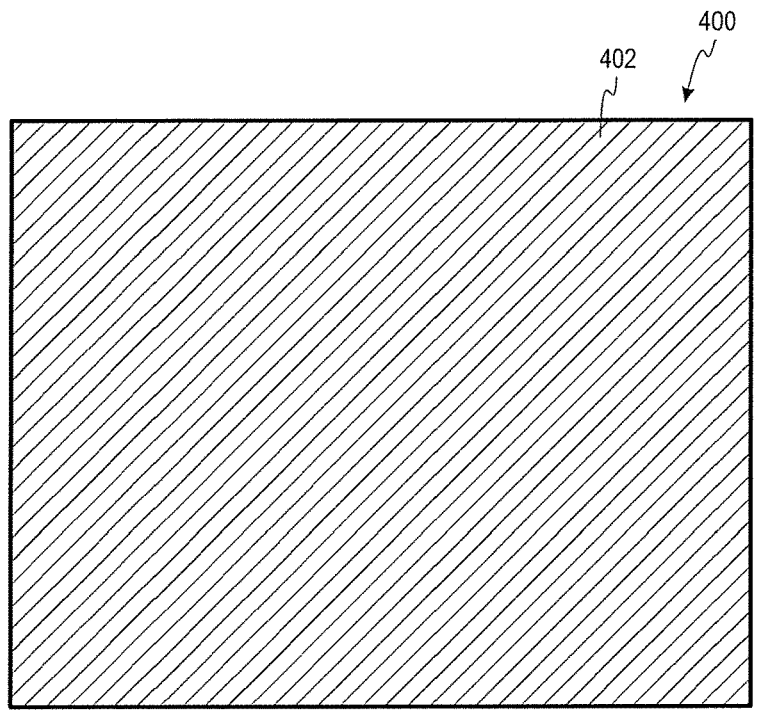
FIG. 4A is a simplified illustration of a frame of video content, without overlaid content.
Figure 4B:
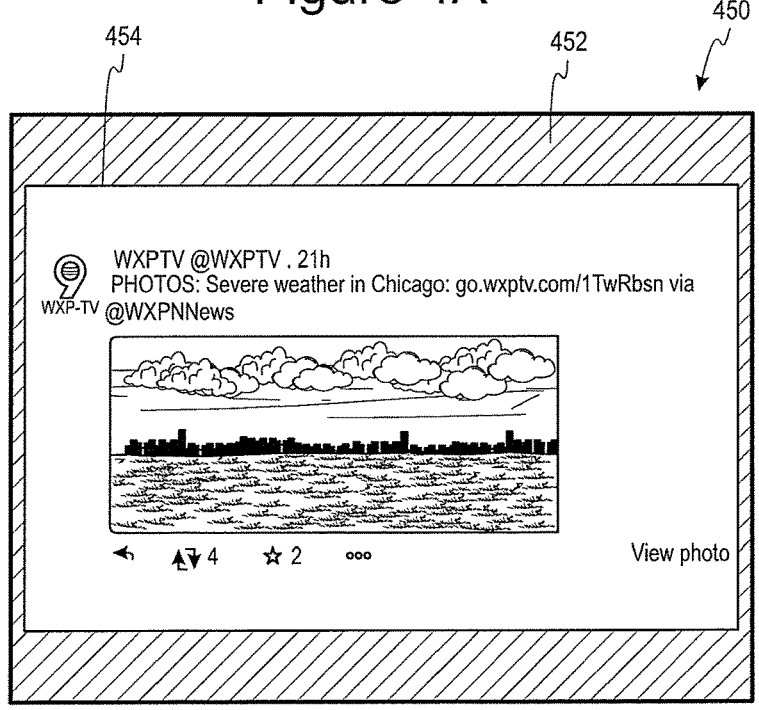
FIG. 4B is a simplified illustration of another frame of video content, with overlaid content.

FIGS. 4A and 4B help illustrate the concept of overlaying content on video content. FIG. 4A is a simplified diagram of a frame 400 of video content. Frame 400 includes content 402, but does not include content overlaid on content 402. For comparison, FIG. 4B is a simplified diagram of another frame 450 of video content. Frame 450 includes content 452 and content 454 overlaid on content 452. Content 454 is a SM content item that includes text indicating that there is severe weather in Chicago and that includes a photo of the severe weather.

As noted above, DVE system 304 can execute a DVE, which causes DVE system to generate video content by modifying other video content. However, as another example, DVE system 304 can execute a DVE, which causes DVE system 304 to generate video content without modifying other video content. This type of DVE is sometimes referred to in the industry to as a "full screen DVE."

DVE system 304 can obtain content for use in connection with executing a DVE in various ways. For example, DVE system 304 can retrieve the content from a data storage unit of DVE system 304. As another example, DVE system 304 can receive the content from a video source, such as video source 302 or SM system 308.

In practice, DVE system 304 can execute multiple DVEs in serial fashion. Further, in practice, VPS 202 can include multiple video sources. In one arrangement, each of multiple video sources can be connected to DVE system 304, and DVE system 304 can switch between one or more inputs as appropriate to receive and use video content in connection with DVE system 304 executing a given DVE.

DVE system 304 can also perform other acts and/or functions related to DVEs. For example, DVE system 304 can create and/or edit DVEs, perhaps based on input received from a user via a user interface. When DVE system 304 creates a DVE, DVE system 304 can generate and store corresponding program instructions for later retrieval and execution. As such, the act of DVE system 304 executing a DVE can include DVE system 304 retrieving and executing program instructions corresponding to the DVE.

DVE system 304 can take various forms, such as a production switcher. An example production switcher is the Vision Octane production switcher provided by Ross Video Ltd. of Iroquois, Ontario in Canada.

SM system 308 can perform acts and/or functions related to SM content items. For example, SM system 308 can retrieve, store, and/or edit a SM content item. Further, SM system 308 can generate and/or output a SM content item or video content that includes a SM content item.

Scheduling system 310 can perform acts and/or functions related to scheduling and/or managing the production of a video program. For example, scheduling system 310 can create and/or edit a program schedule of a video program, perhaps based on input received from a user via a user interface. Sequencing system 306 can then process records in the program schedule. This can cause sequencing system 306 to control one or more other components of VPS 202 to facilitate VPS 202 generating and/or outputting video content, which can serve as or be part of a video program. As such, based on a program schedule, sequencing system 306 can control video source 302, DVE system 304 and/or SM system 308.

A program schedule (sometimes referred to in the industry as a "rundown") serves as a schedule or outline of a video program and can include multiple records. A video program can be conceptually divided into multiple logically-separated portions (sometimes referred to in the industry as "stories"). In one example, each portion of the video program can be represented by a separate record of the program schedule. Each record can include various types of data.

FIG. 5 is a simplified diagram of an example program schedule 500. Program schedule 500 includes ten records represented as ten ordered rows. Each record corresponds to a respective portion of a video program, except for one which corresponds to a commercial break. For each portion, the respective record specifies at least one data item that corresponds to that portion of the video program. In particular, each record specifies at least one of a story title, a video-segment identifier, a duration, and a DVE identifier (which can serve as an instruction to execute the identified DVE).

In this disclosure, the term "video segment" means a portion of video content. In some instances, a video segment consists of logically-related video content. For instance, a video segment can be a commercial or a portion of a television show that is scheduled between two commercial breaks.

As shown in FIG. 5, the first record specifies a story title of STORY A, a video-segment identifier of VS ID A, a duration of 00:02:00:00 (in hours::minutes::seconds::frames format), and a DVE identifier of DVE ID A. As such, upon sequencing system 306 processing the first record, sequencing system 306 can cause video source 302 to playout a video segment identified by the video-segment identifier VS ID A for two minutes, and further can cause DVE system 304 to execute a DVE identified by the DVE identifier DVE ID A, which for example, can cause DVE system 304 to overlay specified content on the identified video segment.

As another example, the third record specifies a story title of STORY C, a duration of 00:00:30:00, and a DVE identifier of DVE ID C. As such, upon sequencing system 306 processing the third record, sequencing system 306 can cause DVE system 304 to execute a DVE identified by the DVE identifier DVE ID C, which for example, can cause DVE system 304 to generate and output video content for two minutes.

It should be noted that program schedule 500 has been greatly simplified for the purposes of illustrating certain features. In practice, a program schedule is likely to include significantly more data such as further details regarding DVE execution timing. In some aspects, sequencing system 306 can be configured to process a next record in the program schedule based on input received from a user via a user interface.

VBS 204 can transmit video content to end-user device 206 for presentation of the video content to an end user. In practice, VBS 204 can transmit video content to a large number of end-user devices for presentation of the video content to a large number of end users. VBS 204 can include various components to facilitate this, such as a terrestrial antenna or a satellite, each of which can be implemented as a computing system.

In this disclosure, the term "video broadcast" means the distribution of video content via any means. As such, VBS 204 can transmit video content to end-user device 206 in various ways. For example, VBS 204 can transmit video content to end-user device 206 over-the-air or via a packet-based network such as the Internet.

End-user device 206 can receive video content from VBS 204, and can present the video content to an end-user via a user interface.

Each of the video-based systems or devices described in this disclosure can include or be integrated with a corresponding audio-based system or device. Likewise, the video content described in this disclosure can include or be integrated with corresponding audio content.

III. Example Operations

Computing system 200 and/or components of computing system 200 can perform various acts. These and related features will now be described.

A. SM Content Item Selection and Acquisition

SM system 308 can obtain a SM content item in various ways. In one aspect, SM system 308 can obtain a SM content item from a SM platform by (i) accessing the SM platform, (ii) selecting the SM content item published on the SM platform, (iii) responsive to the selection, receiving information relating to the selected SM content item, (iv) using the received information to retrieve the SM content item from the SM platform, and (v) storing the retrieved SM content item in a data storage unit.

In some examples, SM system 308 can access a SM platform in a manner that allows a user to view, search for, and/or browse SM content items via a user interface. For instance, SM system 308 can access the SM platform via a web browser application. In one implementation, SM system 308 can directly access the SM platform by using the web browser application to initiate a browsing session, navigate to an IP address of the SM platform, and enter login credentials (if necessary). In another implementation, SM system 308 can indirectly access the SM platform via a SM dashboard application (e.g., TWEETDECK®, CYFE®, or HOOTSUITE®) operating in connection with the web browser application. A SM dashboard application can provide, for example, additional searching and browsing functionalities that may not be provided by the SM platform itself (e.g., based on trend analysis or analytics) and/or access to multiple SM platforms from a common user interface.

Next, SM system 308 can select a SM content item published on the SM platform. In some aspects, SM system 308 can select the SM content item based on an input received from a user via a user interface. As examples, the user can select the SM content item by providing a drag-and-drop input and/or a copy-and-paste input via the user interface. Such examples are described in detail below.

Responsive to SM system 308 selecting the SM content item, SM system 308 can receive information relating to the selected SM content item and can then use the received information to retrieve the selected SM content item from the SM platform. The information can be any information that facilitates retrieving the SM content item from the SM platform. In one example, the information can be a link to the SM content item. To retrieve the selected SM content item, the SM system 308 can use the link to generate and transmit a request for the SM content item to an application programming interface (API) associated with the SM platform.

In another example, the information can include SM system 308 can receive an indication of an account identifier and a timestamp corresponding to the SM content item responsive to the SM system 308 selecting the SM content item. In an implementation in which SM system 308 selects a SM content item via a SM dashboard application, the SM system 308 can retrieve the SM content item by directly accessing the SM platform, navigating to a webpage associated with the account identifier on the SM platform, identifying the SM content item on the webpage based on the timestamp, and then obtaining the identified SM content item from the webpage of the SM platform (e.g., via a screen scraping process). Other examples may also be possible.

In some aspects, after SM system 308 selects a SM content item (perhaps based on user input), SM system 308 can retrieve the SM content item without input from a user. In this way, SM system 308 can automatically retrieve the SM content item responsive to SM system 308 selecting the SM content item. For example, SM system 308 can automatically generate and transmit a request to an API based on a received link without user input. As another example, SM system 308 can automatically navigate to a webpage associated with a received account identifier, identify a SM content item based on the account identifier and a timestamp, and retrieve the identified SM content item without user input. In some aspects, SM system 308 can retrieve the selected SM content item based on input received from a user via a user interface.

The retrieved SM content item can include various types of data such as, for example, (i) data indicating the SM platform from which the SM content item was retrieved (e.g., FACEBOOK™ or TWITTER™), (ii) data identifying the publisher of the SM content item (e.g., an account identifier, such as a username), (iii) a profile picture corresponding to the publisher of the SM content item, (iv) text published by the publisher in connection with the SM content item, (v) an image published by the publisher in connection with the SM content item, (vi) video content published by the publisher in connection with the SM content item, (vii) audio content published by the publisher in connection with the SM content item, (viii) a timestamp indicating a time and/or date at which the SM content item was published on the SM platform, (ix) global positioning system (GPS) coordinates of the publisher when the SM content item was published, (x) GPS coordinates of a location at which an aspect of the SM content item occurred (e.g., a video was filmed or a picture was taken), (xi) a number of other users associated with the publisher on a SM platform (e.g., a number of friends or followers), (xii) an indication of how long the publisher has been a user of a SM platform, (xiii) a timestamp indicating a time and/or date at which an aspect of the SM content item was created (e.g., a time/date a video was recorded or a picture was taken), (xiv) a number of times a SM content item has been shared (e.g., retweeted) by other users of a SM platform, (xv) a number of posts by the publisher on a SM platform, and/or (xvi) any other data that can be integrated into a video program.

In general, the SM system 308 can retrieve all or a portion of the data stored by the SM platform for a selected SM content item. In some aspects, the type of data retrieved for the SM content item can be the same as the type of data published for that SM content item on the SM platform. As one example, in a scenario in which a SM platform publishes an account identifier and text for a SM content item, the SM system 308 can retrieve the account identifier and the text of the SM content item. In some aspects, the SM system 308 can retrieve greater or fewer types of data for a SM content item than the SM platform publishes for that SM content item. For example, in the scenario in which the SM platform publishes an account identifier and text for a SM content item, the SM system 308 can retrieve the account identifier, the text, a timestamp, and a profile picture corresponding to the SM content item. This may be possible, for instance, in implementations in which the SM platform stores additional types of information for the SM content item that are not published on the SM platform.

In some examples, the SM system 308 can retrieve data that is different than the data utilized by the SM platform to publish a particular type of data for the SM content item. For instance, the SM platform may store a relatively high resolution image of a SM content item, but publish a lower resolution version of the image for various reasons (e.g., web browser optimization). Although the SM platform publishes the lower resolution image, the SM system 308 can retrieve the higher resolution image.

In some aspects, the SM system 308 can retrieve data using a set of rules stored by the SM system 308. In an implementation, the set of rules can include one or more subsets of platform-specific rules and each subset can correspond to a different SM platform. This can facilitate SM system 308 retrieving data from SM platforms having a variety of different architectures for publishing, storing, and/or providing access to SM content items. In an example, the set of rules can specify for a particular SM platform whether to retrieve data using a link approach and/or an account identifier and timestamp approach. In another example, the set of rules can provide SM system 308 with a framework for recursively retrieving data from a particular SM platform based on, for instance, data type and/or SM content item architecture (e.g., an architecture used by the SM platform for nesting comments and/or replies associated with a published post of a SM content item). These and other examples are described in further detail below.

Once retrieved, the SM system 308 can store the SM content item in a data storage unit of the SM system 308. In some examples, the SM system 308 can store the SM content item in a database maintained in the data storage unit of the SM system 308 (hereinafter "SMS database"). In such examples, the data retrieved for a SM content item can be stored as a record in the SMS database. The SMS database can have multiple data fields that are each configured to store particular types of data (such as those described above) for the SM content item. Accordingly, SM system 308 can retrieve data for the selected SM content item, parse the data to determine which portions of the data correspond to which fields in the SMS database, and then populate the record in the SMS database with the determined portions of the data in the corresponding fields. The SM system 308 can also assign the record a unique identification (ID) number to facilitate managing the SM content items stored in the SMS database. Depending on the SM content item selected, one or more of the potential fields can be left unpopulated for a stored record in the SMS database.

As noted above, in some examples, SM system 308 can select a SM content item using a drag-and-drop input. To implement a drag-and-drop input, SM system 308 can drag a selectable object associated with the SM content item to a drop-target object, and then SM system 308 can drop the selectable object on the drop-target object. In one implementation, the selectable object can be provided in a first application window displaying the web browser application and the drop-target object can be provided in a second application window displaying a graphical user interface of SM system 308. The graphical user interface of SM system 308 can facilitate operations described herein on retrieved SM content items.

Figure 6:
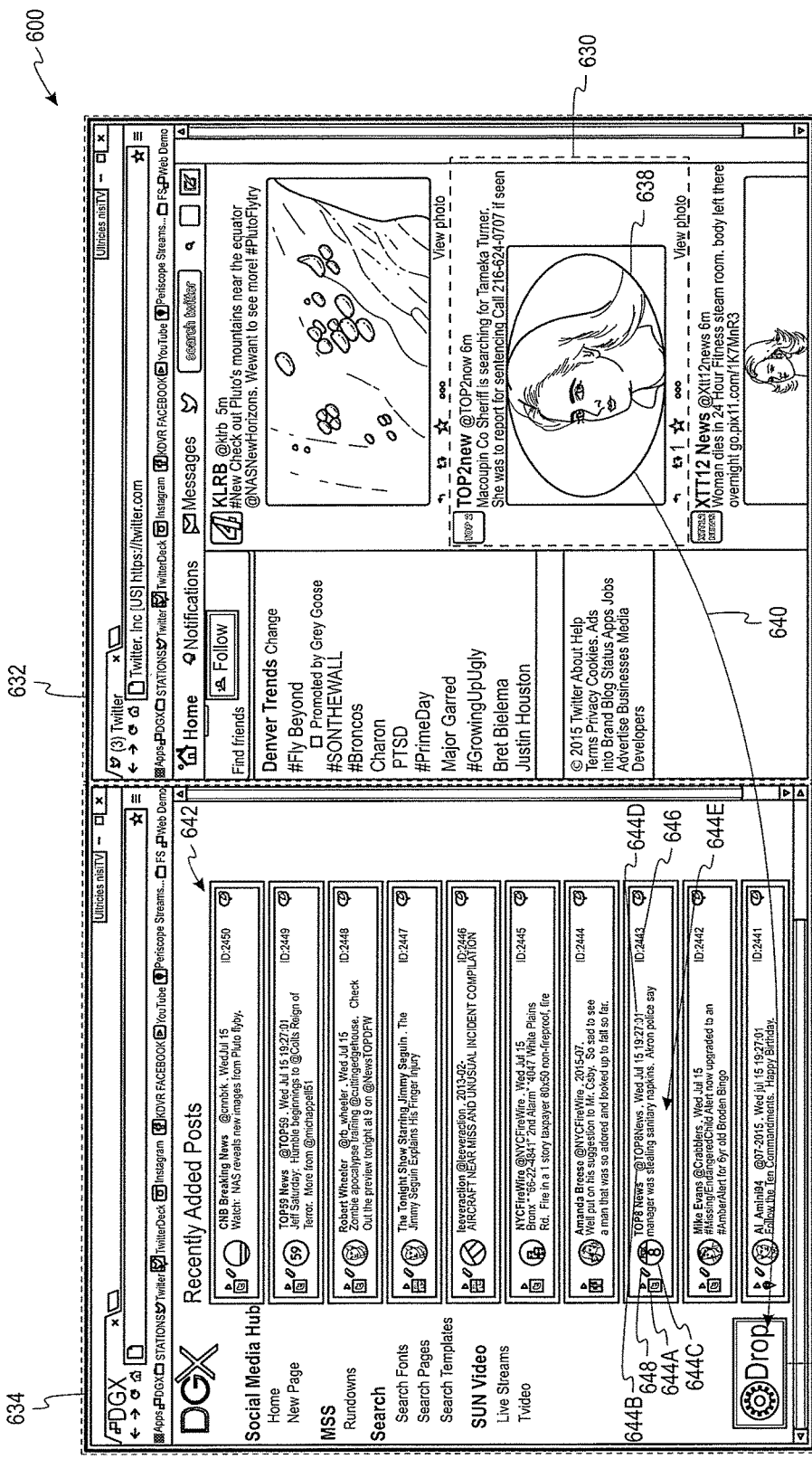
FIG. 6 is a simplified illustration of an example display screen of a SM system.

FIG. 6 illustrates an example display screen 600 of a user interface of SM system 308, showing an example drag-and-drop input for selecting a SM content item 630. The example display screen 600 includes a first application window 632 containing a web browser application and a second application window 634 containing a graphical user interface of the SM system 308. As shown in FIG. 6, the web browser application in the first application window 632 displays a webpage of a SM platform. The webpage can be, for example, associated with a particular account of the SM platform. Thus, the webpage can contain one or more SM content items published by the accountholder or by others having a connection to the accountholder. The accountholder of the SM platform can be the same as or different from a user of the SM system 308. In the illustrated example, the published SM content items displayed in the first application window 632 include the SM content item 630, which is selected by SM system 308 in this example. The SM content item 630 includes an account identifier, a profile picture, text, an image, and a timestamp.

The graphical user interface of SM system 308 displayed in the second application window 634 is a web-based application in the illustrated example. That is, the graphical user interface of the SM system 308 is also displayed via a web browser application. In other examples, the graphical user interface of SM system 308 can be executed and displayed as, for example, a desktop application among other possibilities. As shown in FIG. 6, the graphical user interface includes a drop-target object 636 for adding SM content items to SM system 308. Although the drop-target object 636 is displayed in a lower corner of the second application window 634 in FIG. 6, the drop-target object 636 can be displayed in other locations in other examples.

As noted above, SM system 308 can select the SM content item 630 by dragging a selectable object associated with the SM content item 630 and dropping it onto the drop-target object 636. In the illustrated example, the selectable object is a published image 638 of the SM content item 630. Accordingly, in the illustrated example, to add the SM content item 630 to the SM system 308 (e.g., to the SMS database), SM system 308 can drag the published image 638 of the SM content item 630 from the first application window 632 to the drop-target object 636 in the second window 634. SM system 308 can do so responsive to user input provided via the user interface, for instance. An example drag-and-drop of the published image 638 is shown by arrow 640 in FIG. 6.

In addition to the drop-target object 636, the example user interface illustrated in FIG. 6 includes a list 642 of SM content items recently added to SM system 308. Thus, responsive to selecting the SM content item 630 in FIG. 6, SM system 308 can add the SM content item 630 to the displayed list 642 as well. Displaying the list 642 of SM content items can facilitate operations on the retrieved SM content items as described below (e.g., editing and previewing SM content items).

The listed SM content items can be displayed with at least a portion of the data stored in the SMS database for those SM content items. For example, in FIG. 6, the listed SM content items each have a SM platform icon 644A indicating the SM platform that published the SM content item, an account identifier 644B identifying the publisher of the SM content item, a user profile picture 644C associated with the publisher, a timestamp 644D indicating a time of publication of the SM content item, and at least a portion of text 644E published in connection with the SM content item. Also, in FIG. 6, each SM content item in the list includes an ID number 646 assigned by SM system 308 to the SM content item to facilitate managing the SM content items stored in the SMS database. Some of the listed SM content items can also include an icon 648 (e.g., in the shape of a paperclip) indicating that the SMS database contains data relating to additional content (e.g., an image, video, and/or audio) for the SM content item.

In the example of FIG. 6, the graphical user interface of SM system 308 includes a single drop-target object 636, which can be used to add SM content items to the SMS database. That is, the drop-target object 636 can be configured such that SM system 308 dynamically stores a SM content item in any available storage location within the SMS database responsive to the SM content item being dropped on the drop-target 636. In some aspects, the graphical user interface of SM system 308 can include multiple drop-target objects and/or the drop-target object(s) can be fixedly associated with respective storage location(s) in the SMS database. An example of this is illustrated and described below with respect to FIG. 12.

As noted above, responsive to SM system 308 selecting a SM content item, SM system 308 can receive a link to the selected SM content item on the SM platform. For example, the link can include a uniform resource locator (URL) for a storage location within of a data storage unit at which data associated with the SM content item is stored. Using the received link, SM system 308 can retrieve the SM content item from the SM platform.

In some examples, the SM system 308 can request the SM content item from the SM platform via an API provided by or associated with the SM platform. To do so, the SM system 308 can parse the received link to determine one or more parameters that can be used to request the SM content item via the API. The particular parameter(s) determined from the link can depend on the SM platform as different SM platforms may require different parameters for requesting SM content items via the API. In some implementations, the SM system 308 can parse the link to determine a unique identification number assigned to the published SM content item by the SM platform. Many SM platforms expressly include the unique identification number within the URL corresponding to the SM content item. For example, selecting a SM content item on TWITTER™ can provide the SM system 308 with a URL having a format of:

http://twitter.com/[screen_name]/status/[status_id], where "screen_name" identifies the publisher of the SM content item and "status_id" is the unique identification number assigned to the SM content item by the SM platform. It should be understood that other example parameters are also possible.

After SM system 308 determines the parameter(s), SM system 308 can generate a request for the SM content item. In some instances, the SM platform may specify a particular format for requesting the SM content item via the API. Accordingly, SM system 308 can use the determined parameter(s) to generate a request (also known as an API call) according to the format specified by the SM platform for interfacing with its API. The SM system 308 can then transmit the request to the API to cause the SM platform to provide the requested SM content item to SM system 308. For example, SM system 308 can transmit the request to the API of the SM platform using Hypertext Transfer Protocol (HTTP). As such, SM system 308 can use a web browser application to transmit the request to the API of the SM platform.

In some implementations, the SM system 308 can receive the SM content item from the SM platform in the form of an Extensible Markup Language (XML) file. The SM system 308 can parse the XML file to determine data corresponding to fields in the SMS database, and can then populate the SMS database with the data in the corresponding fields. SM system 308 can also process the XML file to determine whether any additional data associated with the SM content item still needs to be retrieved from the SM platform. For instance, the XML file can include, for some types of media, a pointer to a storage location on a data storage unit of the SM platform. As an example, the XML file can contain a pointer for an image file, a video file, and/or an audio file associated with the selected SM content item. If SM system 308 determines that additional data needs to be retrieved, SM system 308 can use the pointer(s) to access the indicated storage location(s), download the additional data, and store the additional data in the SMS database (e.g., via additional API call(s)). In this way, SM system 308 can recursively retrieve data from the SM platform.

To facilitate SM system 308 receiving a link responsive to a drag-and-drop input, the link can be embedded in the selectable object that is dragged-and-dropped by the SM system 308. For example, in FIG. 6, the user of SM system 308 selects the SM content item 630 by dragging and dropping the published image 638. Thus, in the example of FIG. 6, the published image 638 can be a selectable object having an embedded link to the SM content item 630.

Figure 7A:
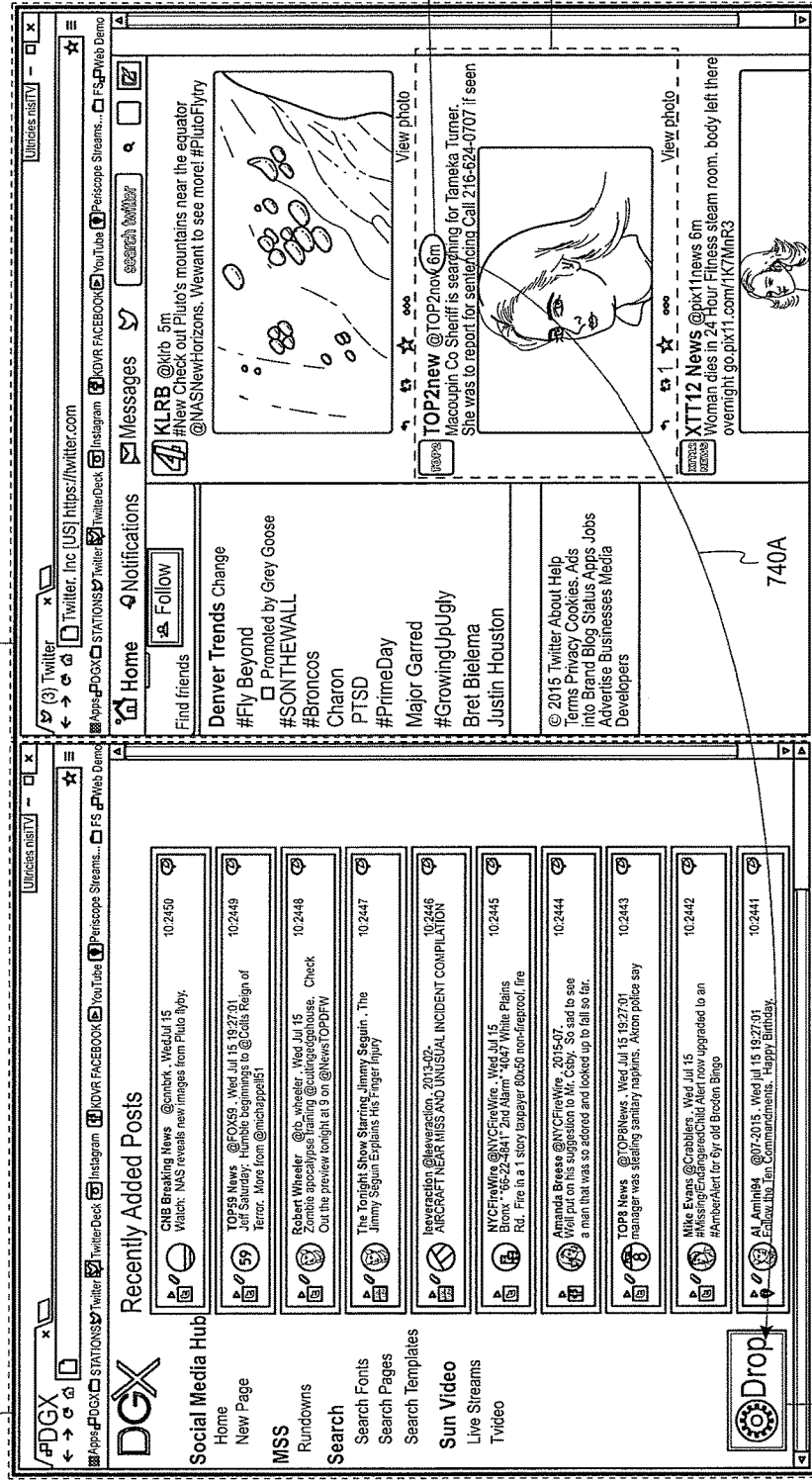
FIG. 7A is a simplified illustration of another example display screen of a SM system.
Figure 7B:
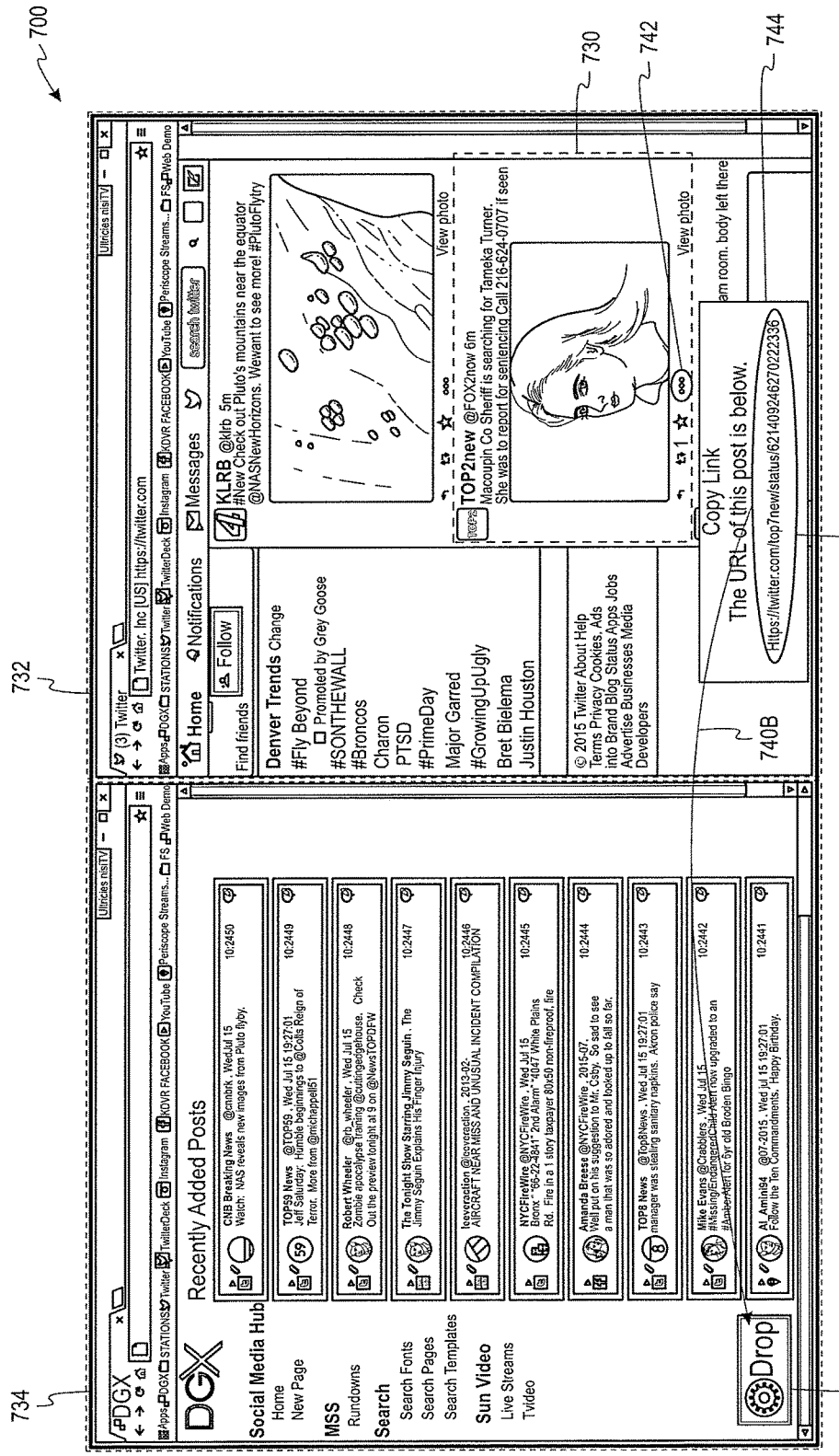
FIG. 7B is a simplified illustration of another example display screen of a SM system.
Figure 7C:
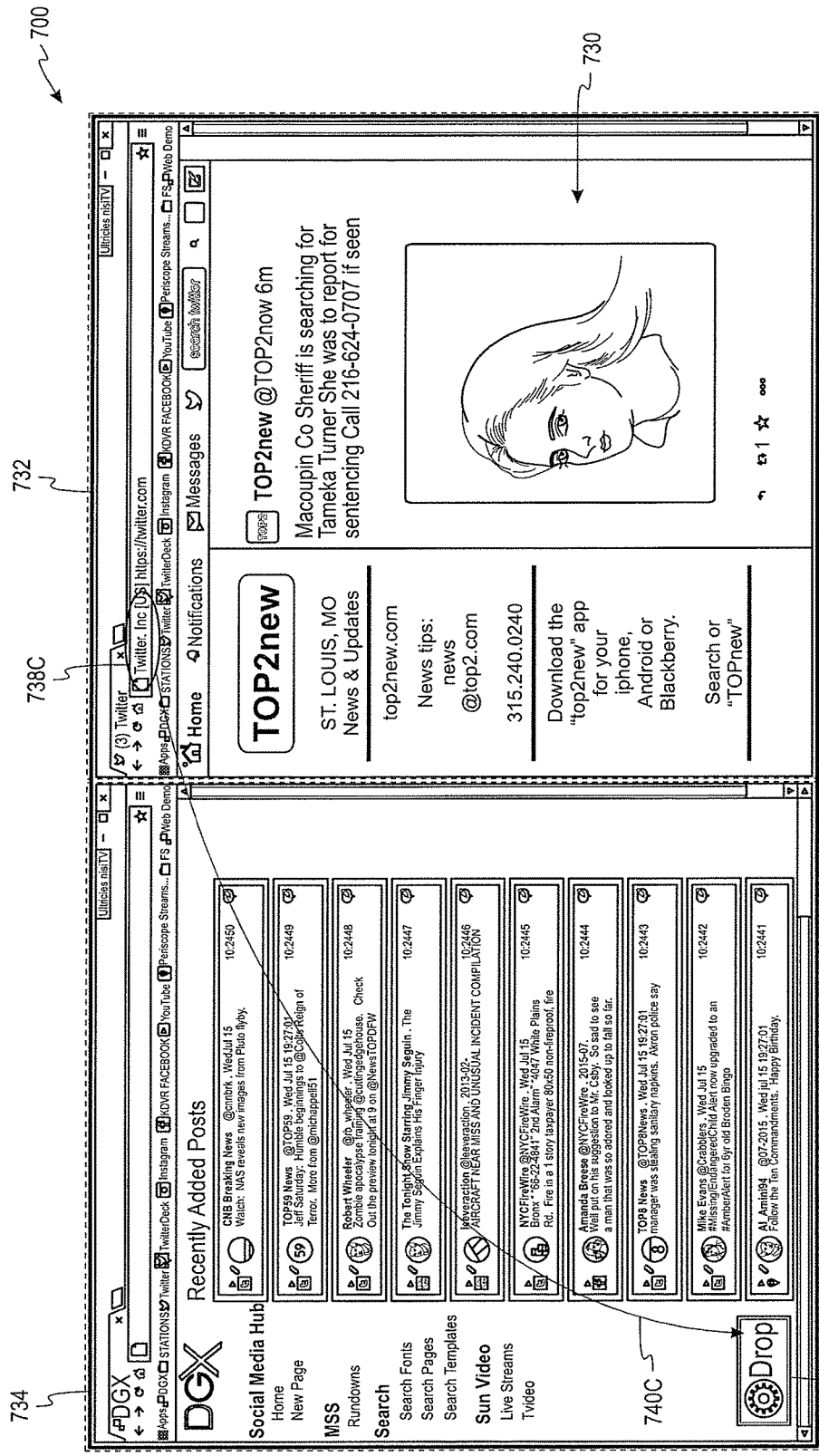
FIG. 7C is a simplified illustration of another example display screen of a SM system.

In other examples, the link can be embedded in other selectable objects associated with a SM content item. FIGS. 7A-7C illustrate some other examples of such selectable objects. In particular, FIGS. 7A-7C illustrate a display screen 700 of SM system 308, including a first application window 732 and a second application window 734. The first application window 732 includes a SM content item 730 published on a SM platform. The second application window 734 includes an example graphical user interface for SM system 308, which contains a drop-target object 736.

In FIG. 7A, the selectable object is in the form of a timestamp 738A associated with the SM content item 730. The timestamp 738A can indicate a time at which the SM platform published the SM content item 730. As indicated by arrow 740A, the user can select the SM content item 730 by dragging the timestamp 738A from the first application window 732 to the second application window 734, and then dropping the timestamp 738A on the drop-target object 736. Responsive to the drag-and-drop of the timestamp 738A, SM system 308 can receive a link embedded in the timestamp 738A. The SM system 308 can then use the link to retrieve the SM content item 730 as described above.

In FIG. 7B, the selectable object is in the form of a URL 738B for a webpage containing the SM content item 730. The user of SM system 308 can access the URL 738B by opening a drop-down menu via button 742 and then selecting an option relating to the URL 738B. In the illustrated example, the URL 738B is displayed in a pop-up window 744 responsive to the user selecting the option in the drop-down menu. As indicated by arrow 740B, the user can select the SM content item 730 by dragging the URL 738B from the first application window 732 to the second application window 734, and then dropping the URL 738B on the drop-target object 736. Responsive to the drag-and-drop of the URL 738B, SM system 308 can receive and process a link embedded in the URL 738B as described above.

In FIG. 7C, the selectable object is in the form of a favicon 738C located in an address bar of a web browser application. The favicon 738C can have an embedded link that corresponds to the URL of the webpage displayed by the web browser in the first application window 732. As such, the user can use the favicon 738C to select the SM content item 730 if the URL of the webpage (and, thus, the favicon) corresponds to the URL of the SM content item 730. As indicated by arrow 740C, the user can select the SM content item 730 by dragging the favicon 738C from the first application window 732 to the second application window 734, and then dropping the favicon 738C on the drop-target object 736. Responsive to the drag-and-drop of the favicon 738C, the SM system 308 can receive and process a link embedded in the favicon 738C as described above.

According to additional or alternative aspects, SM system 308 can select a SM content item published on a SM platform using an input other than a drag-and-drop input. For example, as noted above, a user can select a SM content item using a copy-and-paste input via the user interface. In particular, the user can select a SM content item by (i) copying a URL displayed in an address bar of webpage associated with the SM content item and (ii) pasting the URL into the graphical user interface of SM system 308. In one implementation, the user can paste the URL anywhere in the graphical user interface of SM system 308. In another implementation, the user interface of SM system 308 can include a designated area for the user to paste the URL. By copying and pasting the URL of the webpage associated with the selected SM content item, SM system 308 can receive a link to the SM content item in the SM platform. SM system 308 can then use the link to retrieve the SM content item from the SM platform as described above.

Figure 8:
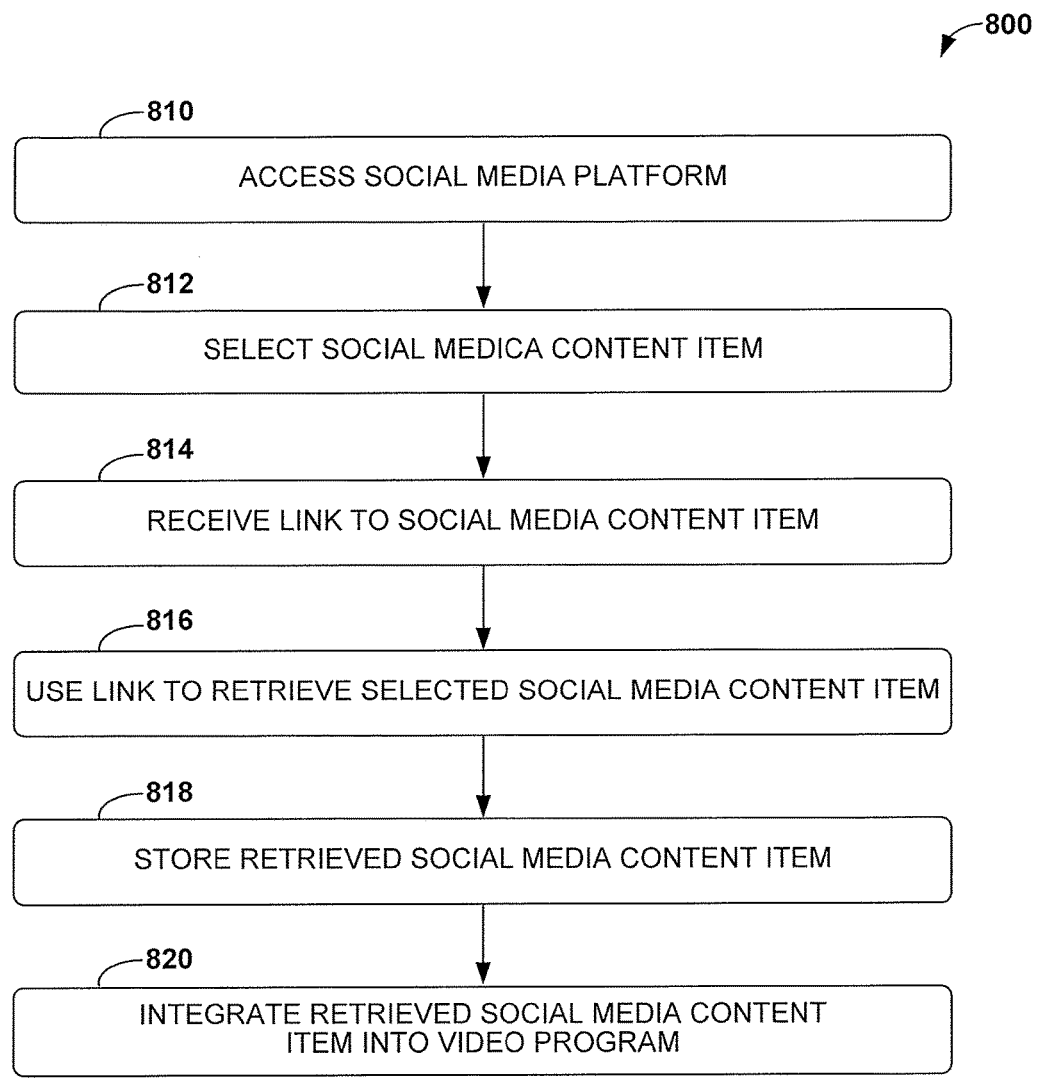
FIG. 8 is a simplified illustration of an example flowchart for obtaining a SM content item from a SM platform.

FIG. 8 illustrates a flowchart of an example process 800 for obtaining a SM content item from a SM platform. As shown in FIG. 8, at block 810, the computing system accesses a SM platform. At block 812, the computing system selects a SM content item published on the SM platform. At block 814, the computing system receives a link to the selected SM content item. At block 816, the computing system uses the received link to retrieve the selected SM content item from the SM platform. At block 818, the computing system stores the retrieved SM content item in a data storage unit. At block 820, the computing system integrates the retrieved SM content item into a video program as described below.

In the example process 800 described for FIG. 8, SM system 308 receives and uses a link to retrieve a selected SM content item. As noted above, in some aspects, SM system 308 can receive and use other information to retrieve a selected SM content item. For example, SM system 308 can receive information indicating an account identifier and a timestamp responsive to SM system 308 selecting a SM content item. The account identifier can identify the publisher of the selected SM item on the relevant SM platform. The account identifier can also be referred to as a username, profile name, screen name, or handle of the publisher. The timestamp can indicate a time at which the selected SM content item was published on the SM platform. To retrieve the selected SM content item, SM system 308 can access a webpage corresponding to the received account identifier on the SM platform, identify the SM content item on the webpage using the received timestamp, and then copy the identified SM content item into a data storage unit of the SM system 308.

In one example, SM system 308 indirectly accesses the SM platform (e.g., via a SM dashboard application) and selects a SM content item (e.g., via a drag-and-drop input). Responsive to SM system 308 selecting SM content item, SM system 308 receives an indication of an account identifier and a timestamp corresponding to the selected SM content item. SM system 308 then directly accesses the SM platform and navigates to a webpage corresponding to the received account identifier. In one implementation, SM system 308 can first access the SM platform and then input the received account identifier into a search functionality of the SM platform to navigate to the webpage corresponding to the received account identifier.

In another implementation, SM system 308 can simultaneously access the SM platform and navigate to the webpage corresponding to the received account identifier. For instance, some SM platforms are configured such that the webpage corresponding to the received account identifier can be determined prior to accessing the SM platform. As one example, FACEBOOK™ is currently structured such that the URL for a webpage corresponding to a particular account identifier can be determined by using www.facebook.com as the domain name and the account identifier as the file path (e.g., the URL for the webpage associated with the username "johndoe1234" can be https://www.facebook.com/johndoe1234). Thus, SM system 308 can process the received account identifier to determine a URL for the webpage corresponding to the account identifier on the SM platform, and the SM system 308 can access the SM platform via that URL.

After navigating to the webpage corresponding to the account identifier, SM system 308 can identify, using the received timestamp, the selected SM content item on the webpage. For example, SM system 308 can crawl the webpage to identify the SM content item having a timestamp that matches the received timestamp. In some instances, the timestamp can be in the form of an absolute time (e.g., a calendar date and/or clock time). In other instances, the timestamp indicated on the webpage can indicate a time differential (e.g., "5 mins ago") between the time at which SM system 308 accessed the webpage and the time at which the SM platform published the SM content item. In such instances, SM system 308 can be operable to compute the time differential to facilitate identifying the selected SM content item from among multiple SM contents published on the webpage.

In some aspects, SM system 308 can utilize a stored set of rules to recursively search within the webpage for the selected SM content item. In an example, the webpage may display some SM content items but hide other SM content items when the SM system 308 initially navigates to the webpage. For instance, the webpage may contain one or more hidden SM content items arranged in a tree-type structure (e.g., nested comments and/or replies, which are initially collapsed on the webpage). These hidden SM content items can be accessed responsive to SM system 308 selecting (e.g., clicking on) certain nested link objects on the webpage. By selecting a nested link object, a part or all of the tree-type structure expands to reveal some or all of the hidden SM content items. In some instances, there may be multiple nested link objects in the tree-type structure so that the SM system 308 has to select each of the multiple nested link objects to access all hidden SM content items in the tree-type structure (e.g., to traverse multiple nesting levels of hidden SM content items in the tree-type structure). In this example, the set of rules utilized by the SM system 308 can recursively detect and select such nested link objects to thereby allow SM system 308 to access and evaluate hidden SM content items in an effort to identify the selected SM content item on the webpage.

Figure 9A:
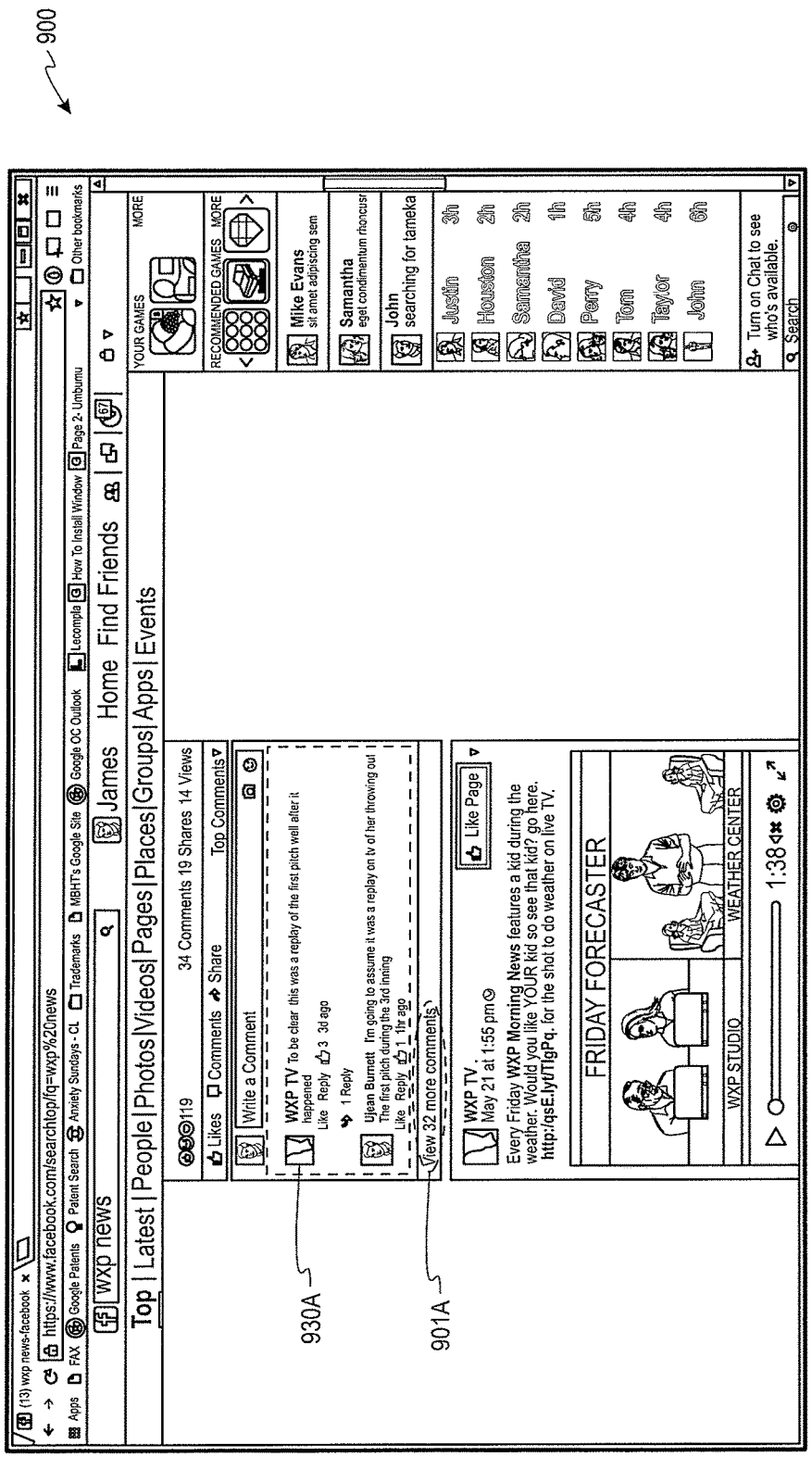
FIG. 9A is a simplified illustration of an example display screen of a SM system.
Figure 9B:
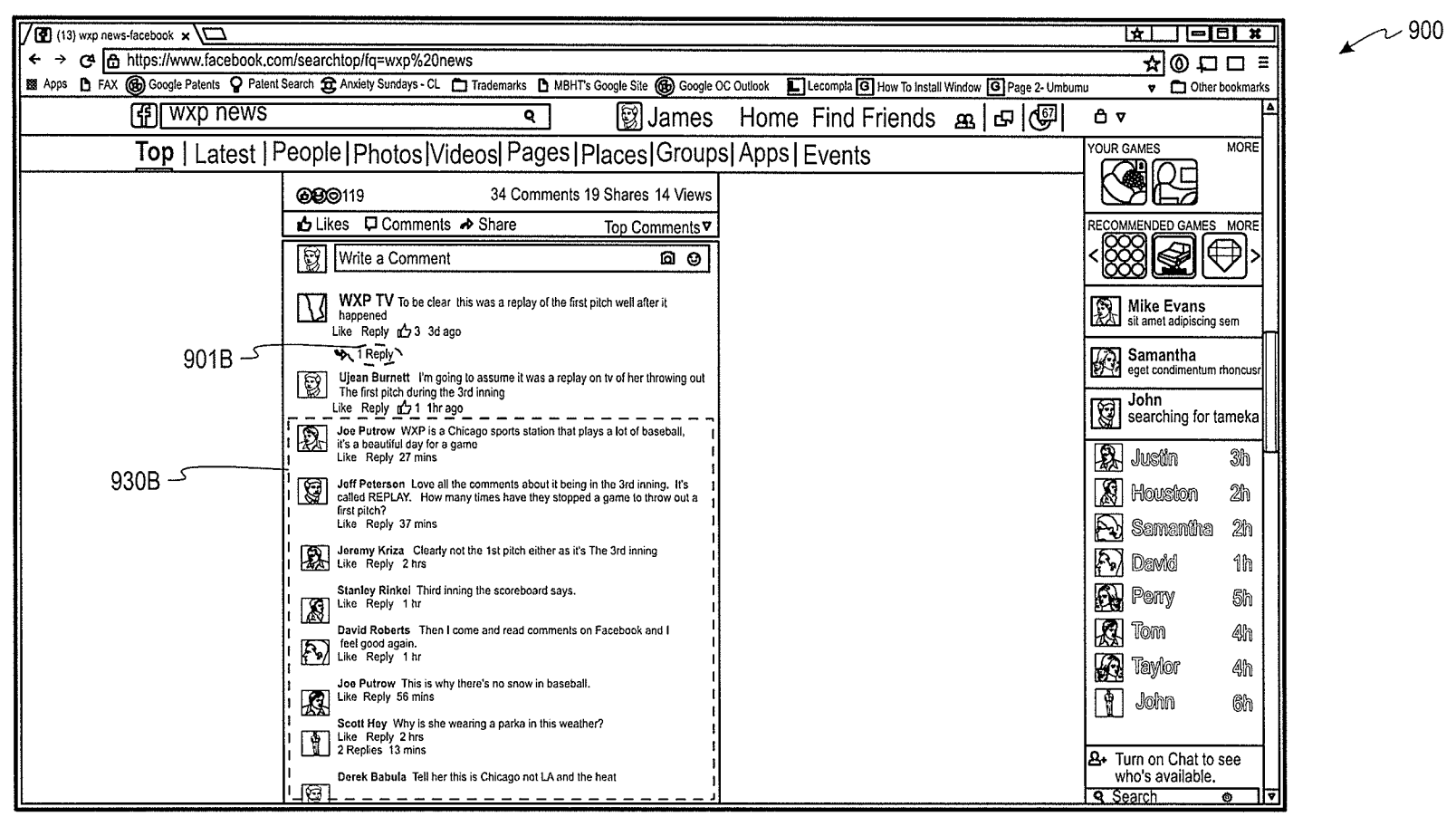
Figure 9C:
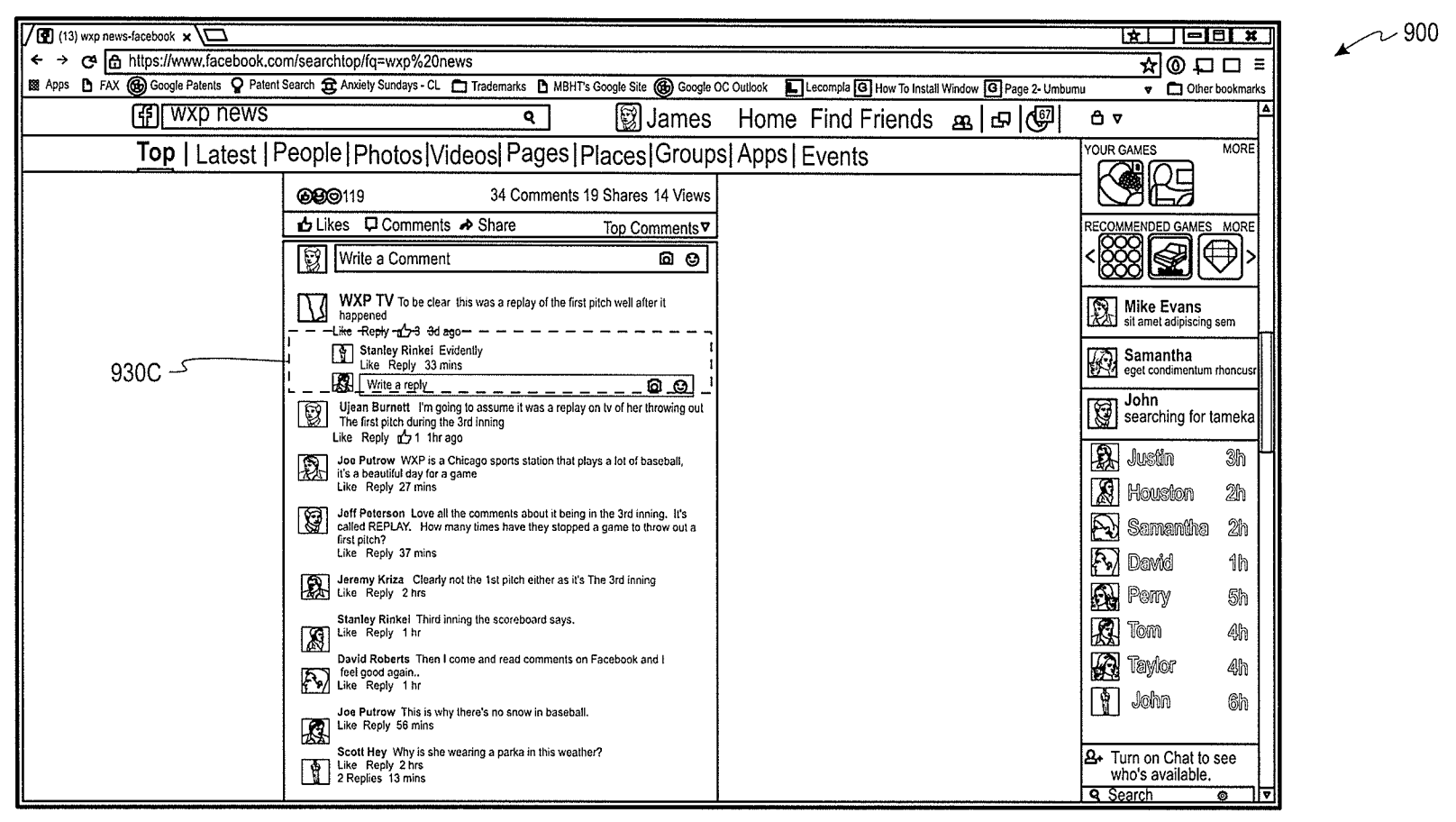

As an example, FIGS. 9A-9C illustrate a display screen 900 of SM system 308 as the SM system 308 detects and selects nested link objects 901A, 901B on a webpage. As shown in FIG. 9A, the webpage initially displays SM content items 930A and a first nested link object 901A. As shown in FIG. 9B, the webpage displays hidden SM content items 930B responsive to SM system 308 selecting the first nested link object 901A displayed by the webpage in FIG. 9A. Additionally, in FIG. 9B, the webpage displays a second nested link object 901B responsive to SM system 308 selecting the first nested link object 901A. As shown in FIG. 9C, the webpage displays additional SM content items 930C responsive to SM system 308 selecting the second nested link object 901B.

After SM system 308 identifies the SM content item, the SM system 308 can then retrieve the identified SM content item from the webpage of the SM platform and can store the SM content item in a data storage unit of SM system 308. For example, SM system 308 can analyze the identified SM content item on the webpage to determine data corresponding to fields in a SMS database and then copy that data into those fields (e.g., via a screen scraping process). For instance, to determine data corresponding to fields in the SMS database, SM system 308 can analyze the webpage to identify files having file extensions corresponding to certain data types (e.g., ".jpg" corresponds to an image, ".txt corresponds to text, ".mov" corresponds to a video, etc.). In an example, the SMS database can include one or more generic fields for storing data identified on the website, which does not correspond to any of the other fields in the SMS database.

In some aspects, the set of rules utilized by SM system 308 can additionally or alternatively cause SM system 308 to detect that an identified SM content item contains a particular type of data and, based on such detection, cause SM system 308 to take certain actions to obtain that type of data for the SM content item. In an example, SM system 308 can detect that an identified SM content item contains an image and the identified SM content item is displayed on a webpage containing other SM content items (e.g., other posts, comments, and/or replies in a nested arrangement). In this example, a rule may specify that when an identified SM content item contains an image and is displayed along with other SM content items on a first webpage, SM system 308 selects an object associated with the identified SM content item to navigate to second webpage corresponding to that SM content item (e.g., a dedicated webpage displaying the identified SM content item without any other SM content items). The SM system 308 can then obtain the image from the second webpage. This may, for instance, facilitate SM system 308 obtaining a higher resolution version of the image. In another example, a rule may specify that similar actions are taken when the identified SM content item contains a video to facilitate SM system 308 obtaining a higher resolution version of the video.

In some instances, this account identifier and timestamp approach to retrieving a SM content item can be employed in scenarios in which a link cannot be obtained responsive to selecting a SM content item. For example, some SM platforms and/or some SM dashboard applications may not provide selectable objects having an embedded link. In other instances, this approach can be applied in scenarios in which the relevant SM platform does not provide an API for requesting SM content items. In still other instances, SM system 308 can employ this approach to provide a more robust system capable of retrieving SM content items in multiple ways. Further still, SM system 308 can optionally combine the link approach with the account identifier and timestamp approach to retrieve SM content items from a particular SM platform.

Figure 10:
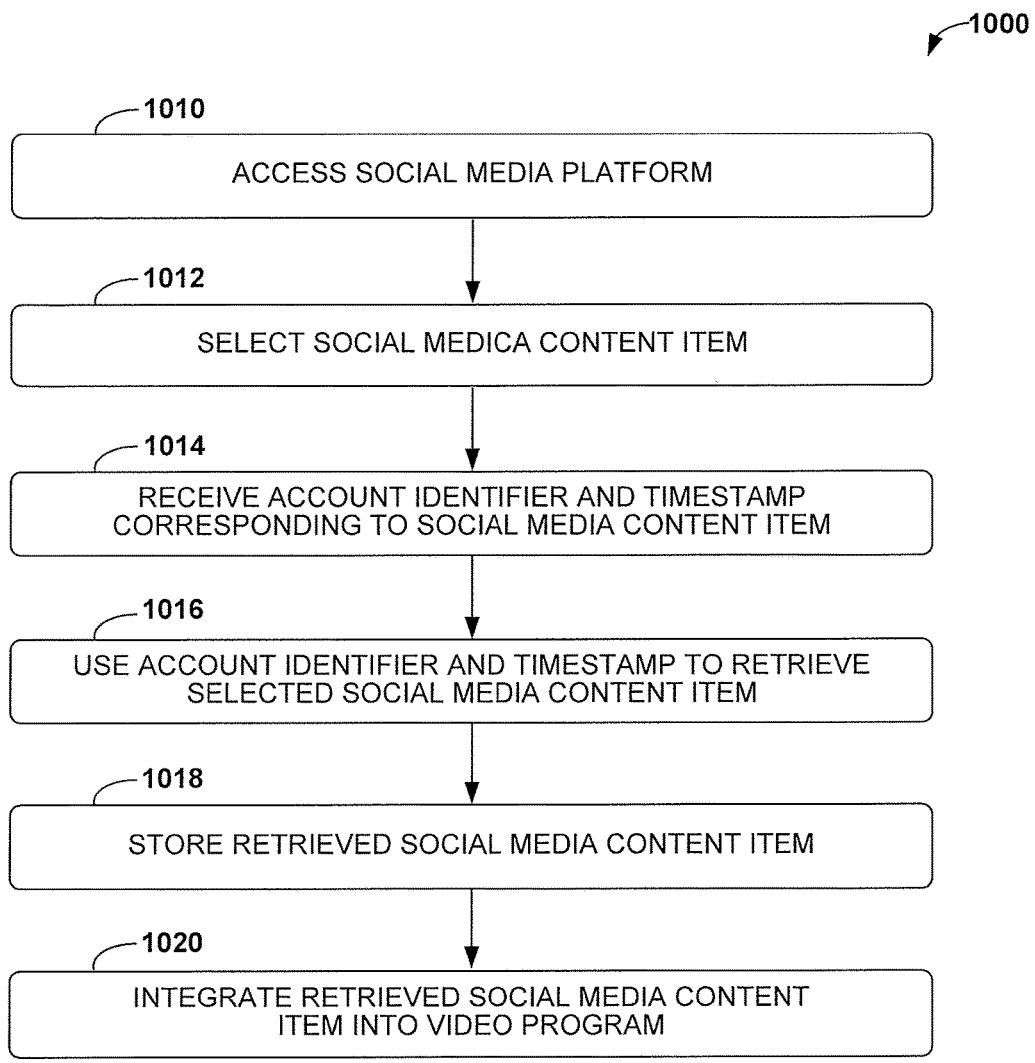
FIG. 10 is a simplified illustration of another example flowchart for obtaining a SM content item from a SM platform.

FIG. 10 illustrates a flowchart of another example process 1000 for obtaining a SM content item from a SM platform. At block 1010, a computing system accesses a SM platform. At block 1012, the computing system selects a SM content item published on the SM platform. At block 1014, responsive to the computing system selecting the SM content item, the computing system receives information indicating an account identifier and a timestamp corresponding to the selected SM content item. At block 1016, the computing system uses the received account identifier and timestamp to retrieve the SM content item from the SM platform. At block 1018, the computing system stores the retrieved SM content item in a data storage unit. At block 1020, the computing system integrates the retrieved SM content item into a video program as described below.

Figure 11:
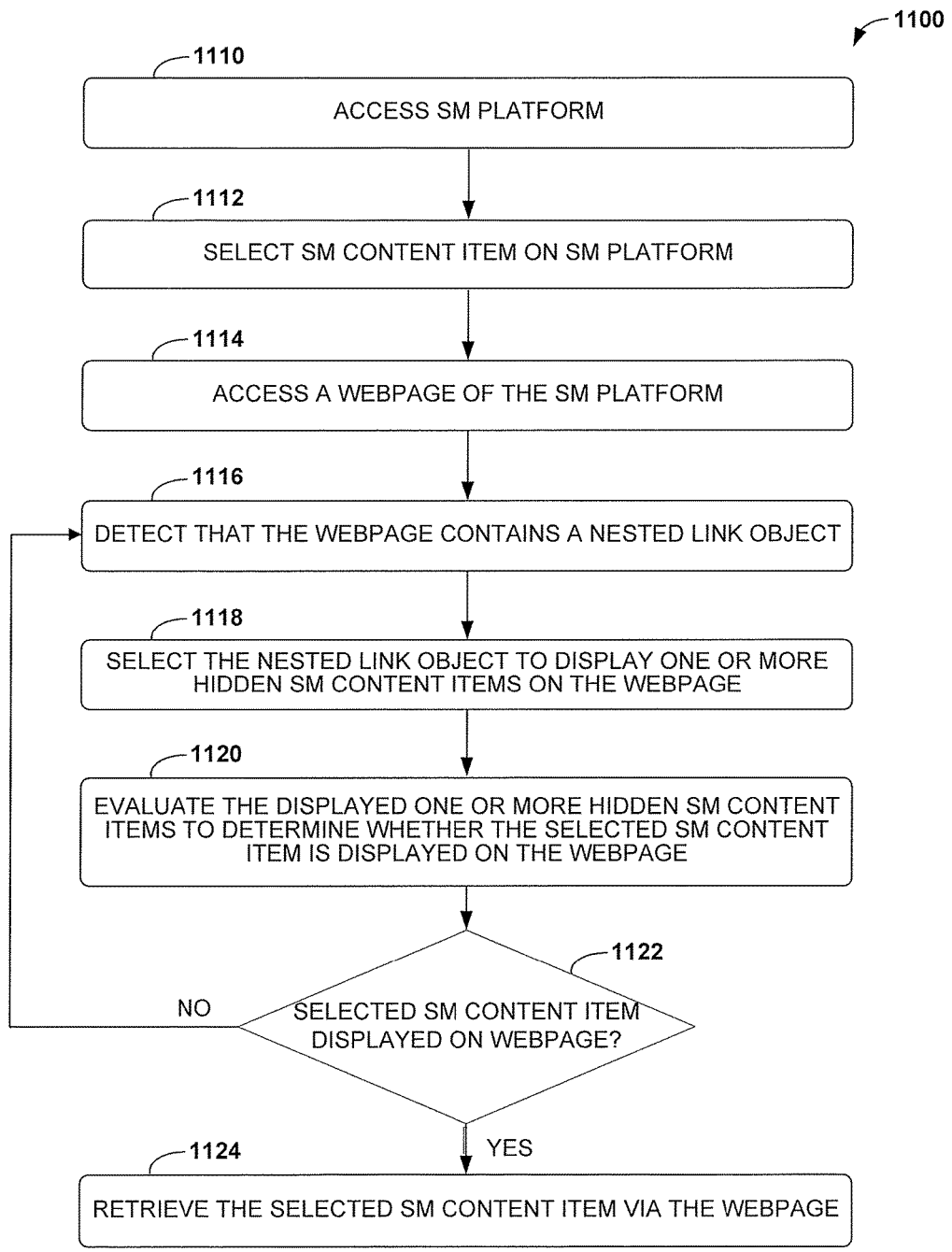
FIG. 11 is a simplified illustration of another example flowchart for obtaining a SM content item from a SM platform.

As noted above, the SM system 308 can retrieve a SM content item by recursively searching and evaluating a webpage for a selected SM content item. FIG. 11 illustrates a flowchart of another example process 1100 for obtaining a SM content item from a SM platform. At block 1110, a computing system accesses a SM platform. At block 1112, the computing system selects a SM content item published on the SM platform. At block 1114, responsive to selecting the SM content item, the computing system accesses a webpage of the SM platform. At block 1116, the computing system detects that the webpage contains a nested link object on the webpage. The nested link object is selectable to display one or more hidden SM content items on the webpage. At block 1118, the computing system selects the nested link object on the webpage to display the one or more hidden SM content items on the webpage. At block 1120, responsive to selecting the nested link object, the computing system evaluates the displayed one or more hidden SM content items on the webpage to determine whether the selected SM content item is displayed on the webpage. At block 1122, the computing system determines, based on the evaluation at block 1120, whether the selected SM content item is displayed on the webpage. If it is determined at block 1122 that the selected SM content item is not displayed on the webpage, then the process 1100 returns to block 1116. If it is determined at block 1122 that the selected SM content item is displayed on the webpage, then the computing system retrieves the selected SM content item via the webpage at block 1124. In this way, the process 1000 can repeat the steps at blocks 1116, 1118, and 1120 until the computing system determines that the selected SM content item is displayed on the webpage.

In one example implementation of the process 1100, the computing system can receive an account identifier and a timestamp that each correspond to the selected SM content item responsive to the selection at block 1112. In this example, the computing system can access the webpage using the received account identifier. Additionally, the computing system can evaluate the displayed hidden SM content item(s) at block 1120 using the received timestamp. For instance, the computing system can determine that the selected SM content item is displayed on the webpage by determining, based on the evaluation, that one of the displayed hidden content items has a timestamp that matches the received timestamp corresponding to the selected SM content item.

In the examples described above, SM system 308 can retrieve a SM content item from the SM platform responsive to SM system 308 selecting the SM content item. According to some aspects, SM system 308 can cache one or more SM content items published by one or more publishers before SM system 308 selects the SM content item(s). For example, SM system 308 can store SM content item(s) in a cache database and then, responsive to SM system 308 selecting a SM content item, SM system 308 can provide stored data for the SM content item from the cache database to the SMS database. This can allow SM system 308 to more rapidly populate the SMS database with selected SM content items published by the one or more publishers.

In one example, SM system 308 can select (perhaps based on input from the user) a publisher from among multiple potential publishers based on criteria such as, for example, a frequency with which the publisher's SM content items have been added to the SMS database in the past, an extent to which the publisher is considered to be an authority on particular topics, and/or an anticipated need for SM content items published by the publisher in the future. For instance, SM system 308 can select a publisher responsive to SM system 308 determining that greater than a threshold number of SM content items published by the publisher were added to the SMS database over a given period of time. Additionally, for instance, in a scenario in which SM system 308 (or a user) determines that a future news broadcast may include a story on a particular event, SM system 308 can select a publisher that is likely to publish SM content items relating to the event. For example, the SM system 308 can analyze a program schedule for an upcoming video program and automatically select the publisher based on the analysis of the program schedule. Other examples of criteria that can be used to select a publisher are also possible. After SM system 308 selects the publisher, SM system 308 monitors activity by the publisher on the SM platform and stores, in a cache database, SM content items published on the SM platform by the publisher.

In an example implementation, SM system 308 can use a stored set of rules to cache SM content items for a selected publisher. The rules can, for example, facilitate SM system 308 recursively searching for, identifying, selecting, and retrieving SM content items on the webpage associated with the selected publisher. In an aspect, the set of rules can provide a framework for recursively searching for SM content items on a webpage associated with the selected publisher in a manner similar to that described above. For example, as described above, the webpage may contain one or more hidden SM content items that are initially hidden in a tree-structure, but which can be displayed by selecting nested link object(s) on the webpage. The rules can facilitate SM system 308 searching for SM content items by recursively detecting and selecting such nested link objects so that SM system 308 can access a tree of hidden SM content items from the root down. Such rules can thus facilitate SM system 308 comprehensively identifying some or all SM content items on the webpage associated with the publisher (including SM content items that may be initially hidden or otherwise inaccessible when SM system 308 initially navigates to the webpage).

As SM system 308 identifies SM content items on the webpage, SM system 308 can select those SM content items and responsively receive information identifying the SM content item (e.g., a link and/or an account identifier and timestamp) from the SM platform. The SM system 308 can then compare the received information to the cache database to determine whether the SM content item associated with the information was previously retrieved and stored in the cache database. If SM system 308 determines that the information identifying the SM content item is not present in the cache database, then SM system 308 can retrieve the SM content item as described above.

In some aspects, SM system 308 can periodically repeat this cache process of searching for, identifying, selecting, and retrieving SM content items for a selected publisher on a SM platform. In one example, SM system 308 can repeat this cache process to update the cache database once every five minutes. The interval between updates can be different in other examples.

As noted above, after the cache database has been populated with SM content items, SM system 308 can use the cache database to add a SM content item to the SMS database (e.g., for preparing and/or integrating the SM content item into a media program). In particular, SM system 308 can access the SM platform and select a SM content item, for example, as described above with respect to FIGS. 6-7C. Responsive to SM system 308 selecting the SM content item, SM system 308 can receive information identifying the SM content item. For example, SM system 308 can receive a link and/or an indication of an account identifier and timestamp as described above. Using the received information, SM system 308 can determine whether the selected SM content item is stored in the cache database. If SM system 308 determines that the selected SM content item is stored in the cache database, SM system 308 can provide the SM content item from the cache database to the SMS database. Otherwise, SM system 308 can retrieve the selected SM content item from the SM platform as described above.

Figure 12:
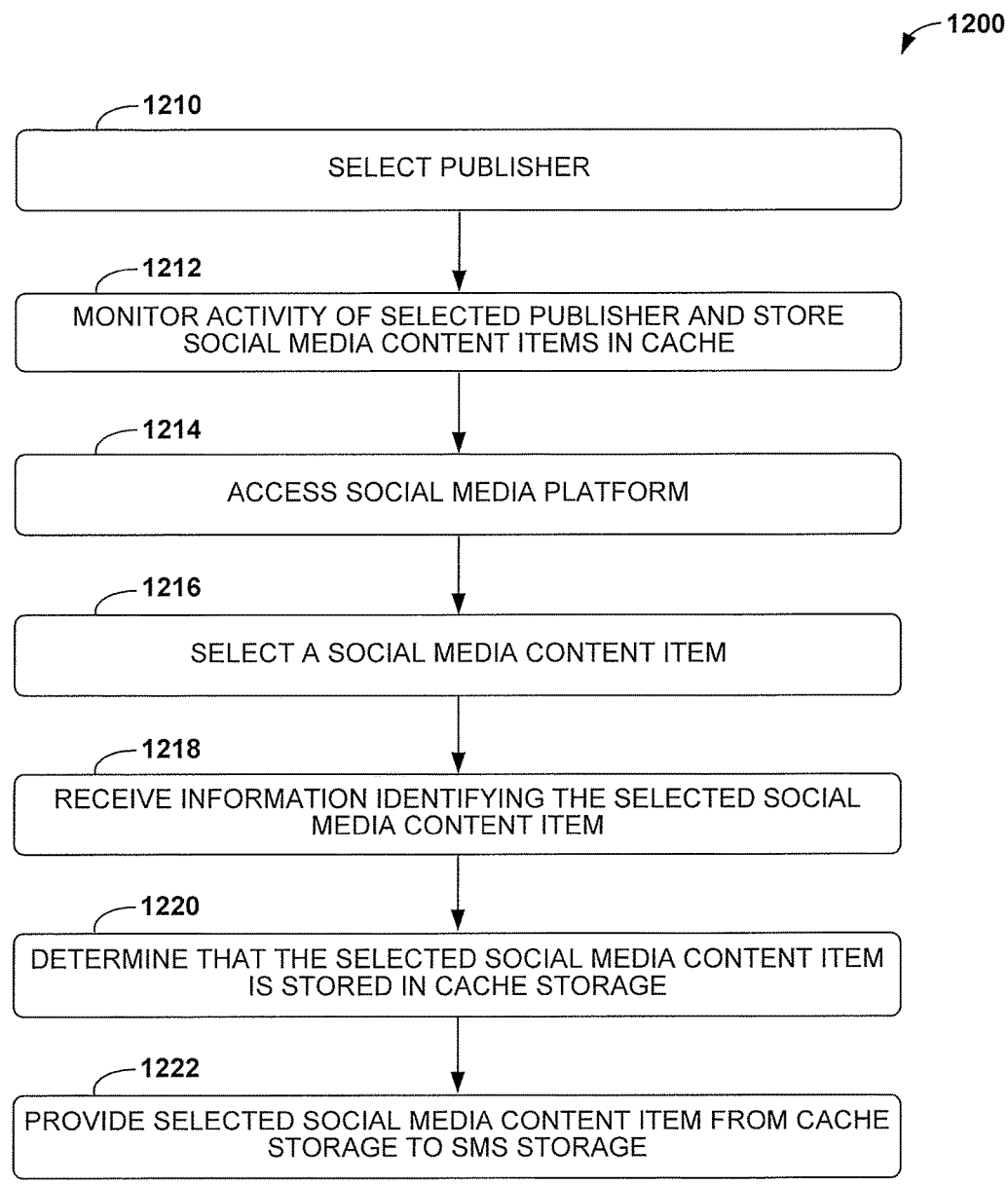
FIG. 12 is a simplified illustration of another example flowchart for obtaining a SM content item from a SM platform.

FIG. 12 illustrates a flowchart of another example process 1200 for obtaining a SM content item. At block 1210, a computing system selects a publisher of SM content items on a SM platform. At block 1212, the computing system monitors activity by the publisher on the SM platform and stores, in a cache database, SM content items published on the SM platform by the publisher. At block 1214, the computing device accesses the SM platform. At block 1216, the computing system selects a SM content item published by the publisher on the SM platform. At block 1218, the computing system receives information identifying the SM content item. At block 1220, the computing system determines that the selected SM content item is stored in the cache database based on the information received at block 1018. At block 1222, the computing system provides the identified SM content item from the cache database to an SMS database.

Figure 13:
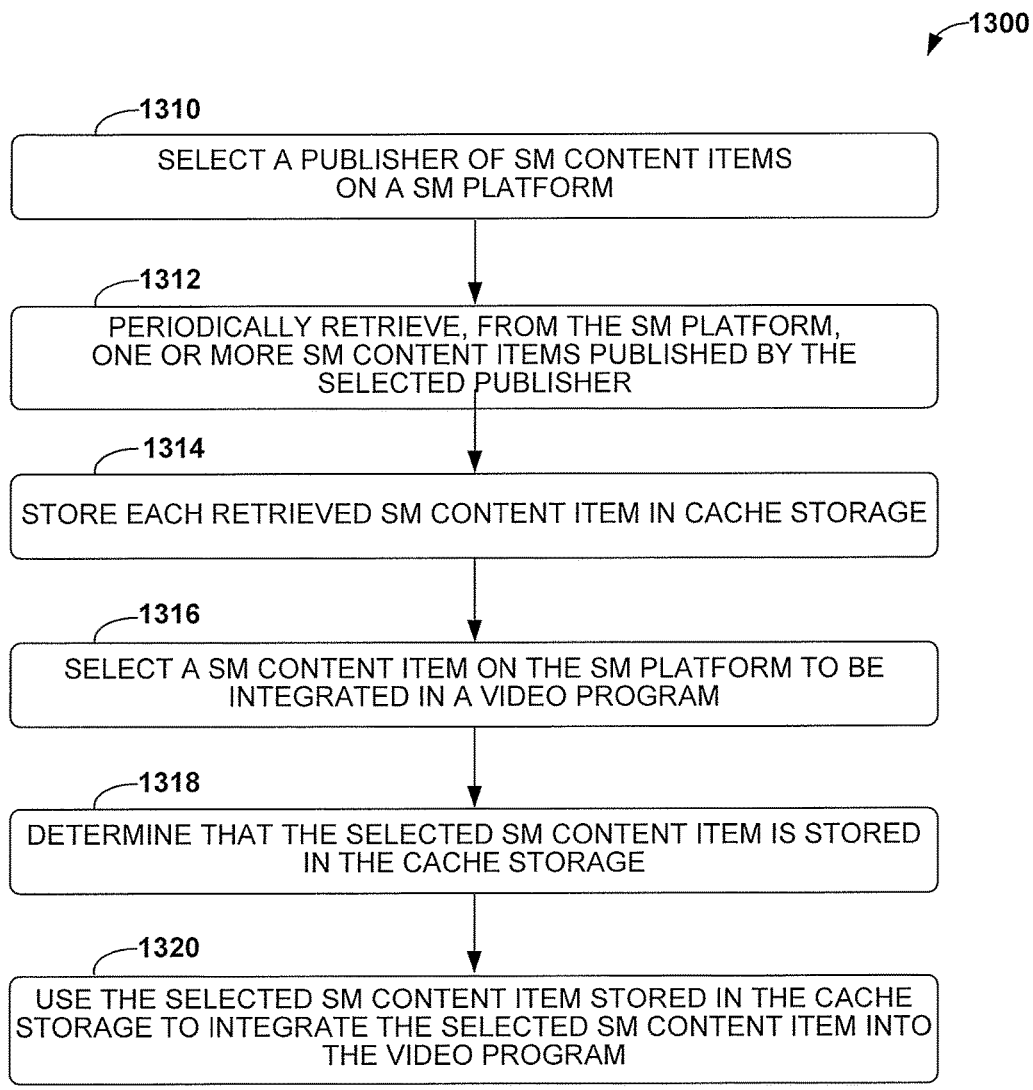
FIG. 13 is a simplified illustration of another example flowchart for obtaining data associated with a SM content item from a SM platform.

FIG. 13 illustrates a flowchart of another example process 1300 for obtaining a SM contain item. At block 1310, a computing system selects a publisher of SM content items on a SM platform. At block 1312, the computing system periodically retrieves, from the SM platform, one or more SM content items published by the selected publisher. At block 1314, the computing system stores each retrieved SM content item in cache storage of the computing system. At block 1316, the computing system selects a SM content item on the SM platform to be integrated in a video program. At block 1318, responsive to selecting the SM content item, the computing system determines that the selected SM content item is stored in the cache storage. At block 1320, the computing system uses the selected SM content item stored in the cache storage to integrate the selected SM content item into the video program.

In one example implementation, the computing system can store each retrieved SM content item in the cache storage at block 1314 by (i) receiving information corresponding to the SM content item, (ii) determining whether the SM content item was previously stored in the cache storage using the received information, and (iii) responsive to determining that the SM content item was not previously stored in the cache storage, storing the SM content item in the cache storage. The received information can be, for example, a timestamp corresponding to the retrieved SM content item. In such this example, the computing system can determine whether the SM content item was previously stored in the cache storage by comparing the timestamp to timestamp information stored in the cache storage for previously retrieved SM content items.

In an example implementation, the computing system can retrieve the one or more SM content items at block 1312, by (a) periodically accessing a webpage corresponding to the selected publisher on the SM platform, (b) detecting that the webpage contains a nested link object on the webpage, (c) selecting the nested link object on the webpage to display the one or more hidden SM content items on the webpage, (d) responsive to selecting the nested link object, the computing system retrieving the displayed one or more hidden SM content items on the webpage, and (e) repeating acts (b)-(d) until a condition is met. The condition can be met, for example, when the computing system follows a link that leads outside of the SM platform (e.g., selecting a link to a different SM platform) and/or when the computing system has traversed more than a predetermined number of levels down a tree-type structure of hidden content items (e.g., after the computing system carries out acts (b)-(d) the predetermined number of times). In one example, the predetermined number can be eight such that the computing system will discontinue retrieving SM content items for a particular instance of block 1312 after the computing system has carried out acts (b)-(d) eight times. Other examples are also possible.

As noted above, SM system 308 can select a SM content item based on an input received from a user via a user interface. According to some aspects, SM system 308 can select a SM content item without user input. For example, SM system 308 can receive a communication from a third party source, process the communication to determine information relating to a SM content item, and then use the determined information to retrieve the SM content item from the SM platform (or cache storage).

In one implementation, SM system 308 can include or have access to an email inbox, which receives an email including an indication of one or more published SM content items. In some instances, a third party source can send the email to the inbox to suggest a SM content item that can be of interest to the user. One example of a third-party email service that provides emails including indications of SM content items is DATAMINR® provided by DATAMINR, INC of New York City, N.Y. When the email is received, SM system 308 can determine from the email information relating to the SM content item. The determined information can be in the form of a link to the SM content item and/or an indication of the account identifier and the timestamp corresponding to the SM content item. Using the determined information, SM system 308 can obtain the SM content item as described above.

In some examples, SM system 308 can obtain all SM content items indicated in a received communication. In other examples, SM system 308 can determine which (if any) of the SM content item(s) indicated in the communication should be retrieved. To do so, SM system 308 can determine characteristic information for each SM content item in the communication and compare the characteristic information to one or more predetermined criteria, for instance. The characteristic information and predetermined criteria can relate to the identity of the publisher, the presence and/or quantity of certain keywords or phrases, etc. Other examples are also possible.

Figure 14:
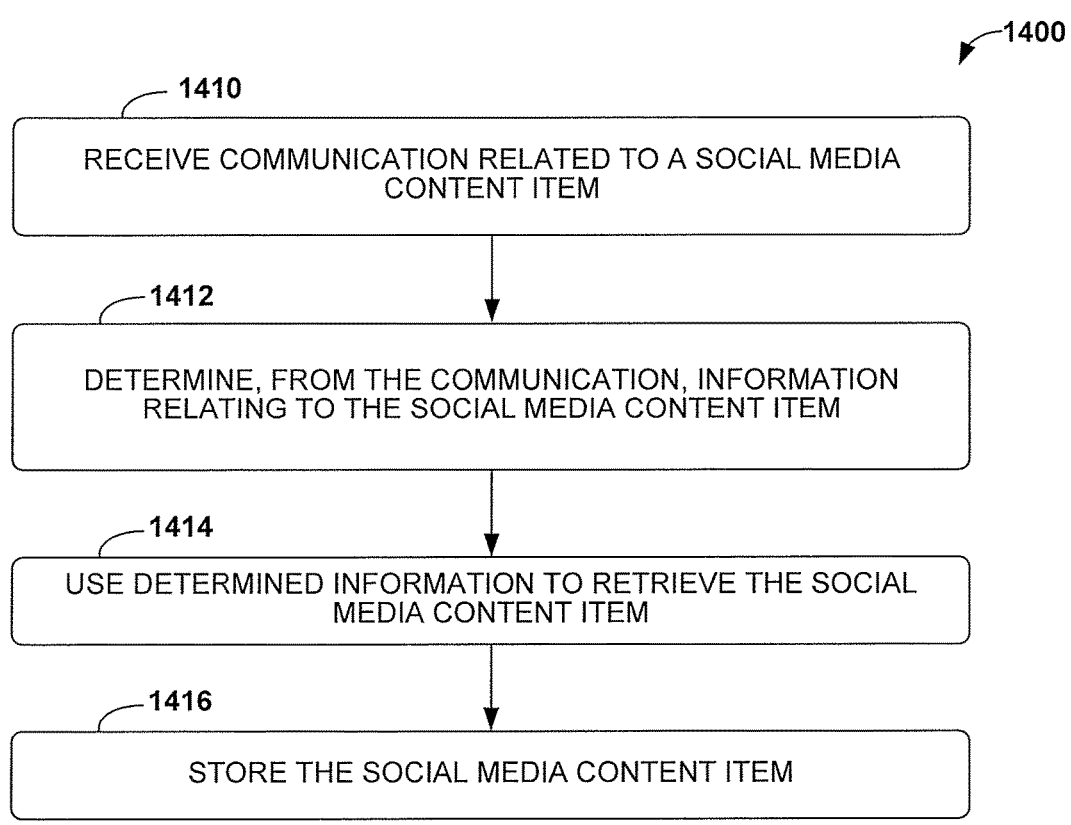
FIG. 14 is a simplified illustration of another example flowchart for obtaining data associated with a SM content item from a SM platform.

FIG. 14 illustrates a flowchart of an example process 1400 for obtaining SM data associated with a SM content item. As shown in FIG. 14, at block 1410, a computing system receives a communication related to a SM content item. At block 1412, the computing system processes the communication to determine information relating to the SM content item. At block 1414, the computing system uses the determined information to retrieve the SM content item. At block 1416, the computing system stores the retrieved SM content item in a data storage unit.

Figure 15:
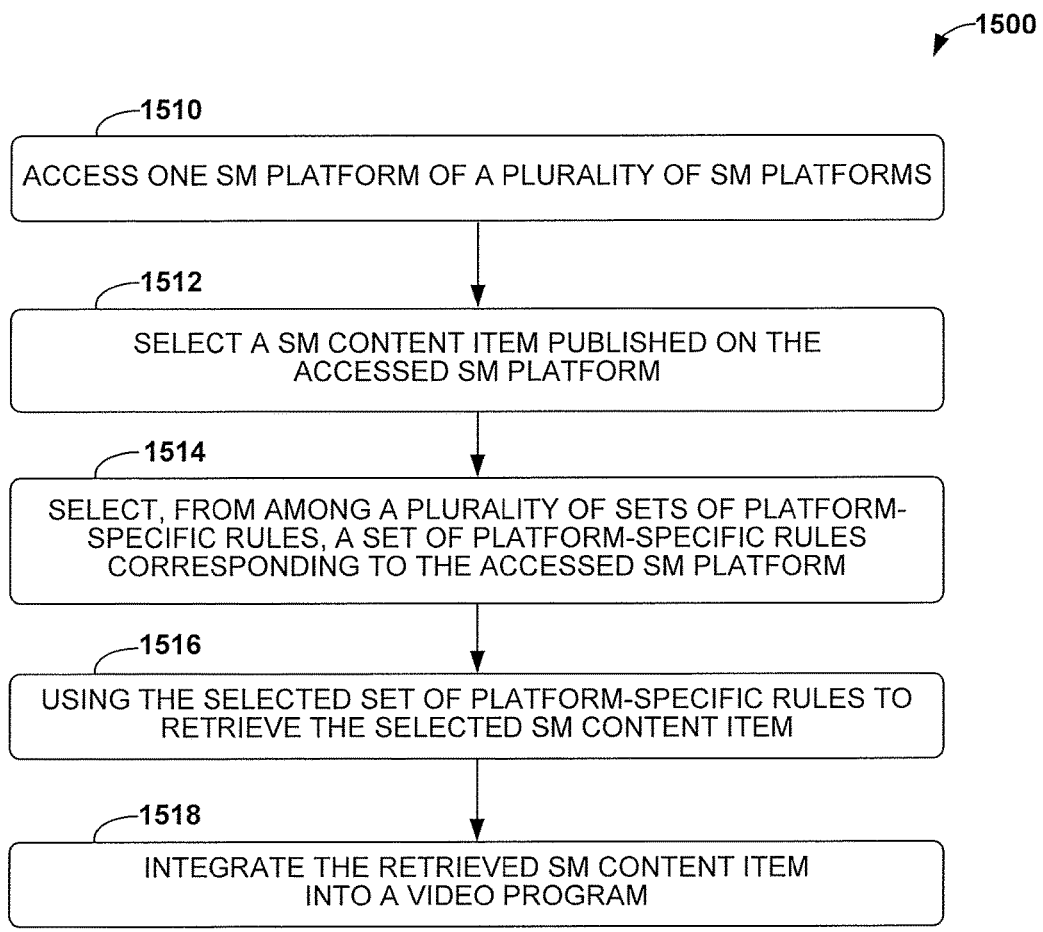
FIG. 15 is a simplified illustration of another example flowchart for obtaining data associated with a SM content item from a SM platform.

As noted above, the SM system 308 can use a plurality of sets of platform-specific rules to obtain SM content items from different SM platforms. FIG. 15 illustrates a flowchart of an example process 1500 for retrieving an SM content item using platform-specific rules. In this example, a computing system is operable to access a plurality of SM platforms, and the computing system stores a plurality of sets of platform-specific rules for retrieving SM content items from the plurality of SM platforms. Each set of the platform-specific rules corresponds to a respective one of the plurality of SM platforms.

At block 1510, the computing system accesses one SM platform of the plurality of SM platforms. At block 1512, the computing system selects a SM content item published on the accessed SM platform. At block 1514, responsive to the selection of the SM content item on the SM platform, the computing system selects, from among the plurality of sets of platform-specific rules, a set of platform-specific rules corresponding to the accessed SM platform. At block 1516, the computing system uses the selected set of platform-specific rules to retrieve the selected SM content item. At block 1518, the computing system integrates the retrieved SM content item into a video program.

Figure 16:
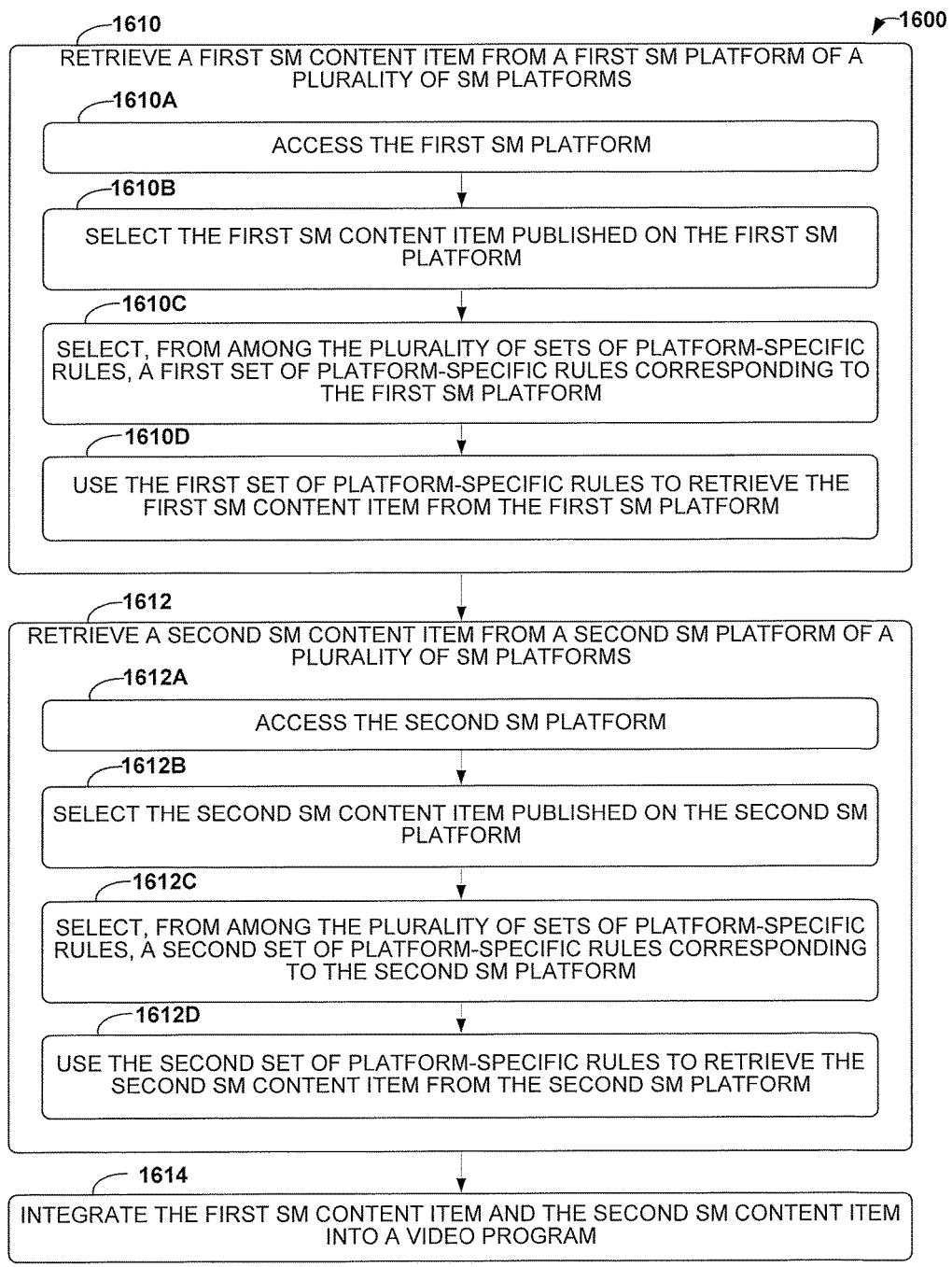
FIG. 16 is a simplified illustration of another example flowchart for obtaining data associated with a SM content item from a SM platform.

FIG. 16 illustrates another flowchart of an example process 1600 for retrieving SM content items using platform-specific rules. In this example, a computing system is operable to access a plurality of SM platforms, and the computing system stores a plurality of sets of platform-specific rules for retrieving SM content items from the plurality of SM platforms. Each set of the platform-specific rules corresponds to a respective one of the plurality of SM platforms.

At block 1610, the computing system retrieves a first SM content item from a first SM platform of the plurality of SM platforms. As shown in FIG. 16, the computing system can retrieve the first SM content item at block 1610 by performing the operations specified in blocks 1610A-1610D. At block 1610A, the computing system accesses the first SM platform. At block 1610B, the computing system selects the first SM content item published on the first SM platform. At block 1610C, responsive to selecting the first SM content item on the first SM platform, the computing selects, from among the plurality of sets of platform-specific rules, a first set of platform-specific rules corresponding to the first SM platform. At block 1610D, the computing system uses the first set of platform-specific rules to retrieve the first SM content item from the first SM platform.

At block 1612, the computing system retrieves a second SM content item from a second SM platform of the plurality of SM platforms. As shown in FIG. 16, the computing system can retrieve the first SM content item at block 1612 by performing the operations specified in blocks 1612A-1612D. At block 1612A, the computing system accesses the second SM platform. At block 1612B, the computing system selects the second SM content item published on the second SM platform. At block 1612C, responsive to selecting the second SM content item on the second SM platform, the computing selects, from among the plurality of sets of platform-specific rules, a second set of platform-specific rules corresponding to the second SM platform. At block 1612D, the computing system uses the second set of platform-specific rules to retrieve the second SM content item from the second SM platform.

At block 1614, the computing system integrates the first SM content item and the second SM content item into a video program.

Although the concepts describe above may relate to SM system 308 obtaining SM content items and/or associated data, SM system 308 can obtain other data using techniques similar to those described above. In one example, the user can ingest into SM system 308 data stored on a personal computer (PC) desktop by dragging a file from a folder on the PC desktop to a drop-target object provided in the graphical user interface of the SM system 308. In another example, the user can copy the file from the folder and paste it into the user interface of SM system 308. In a further example, the user can add an image on a webpage of a web browser to SM system 308 by copying a URL of the image and pasting it into the user interface of SM system 308. Other examples can also be possible.

B. SM Content Item Preparation

Once the SMS database is populated with one or more SM content items, SM system 308 can prepare the SM content item(s) for integration into the video program. This process can include SM system 308 selecting a template from among multiple templates to determine an arrangement and/or layout for presenting the SM content item(s) in the video program. The templates can include graphics and/or animations that are pre-formatted to allow for aspects of one or more SM content items to be incorporated by a CG in pre-defined ways. For example, a template can define respective positions at which text, images, and/or videos of the SM content item can be overlaid on a video segment of the video program. The template can also define an order in which different SM content items will be presented during the video program. Thus, video programs (e.g., news stories) can easily be produced by leveraging a previously created template. This can save time and maintain format consistency across multiple video programs and/or portions thereof.

According to some aspects, the template can be modified by a user of SM system 308 in various ways. According to additional aspects, the template can also be selected before the SM content items are selected.

Figure 17:
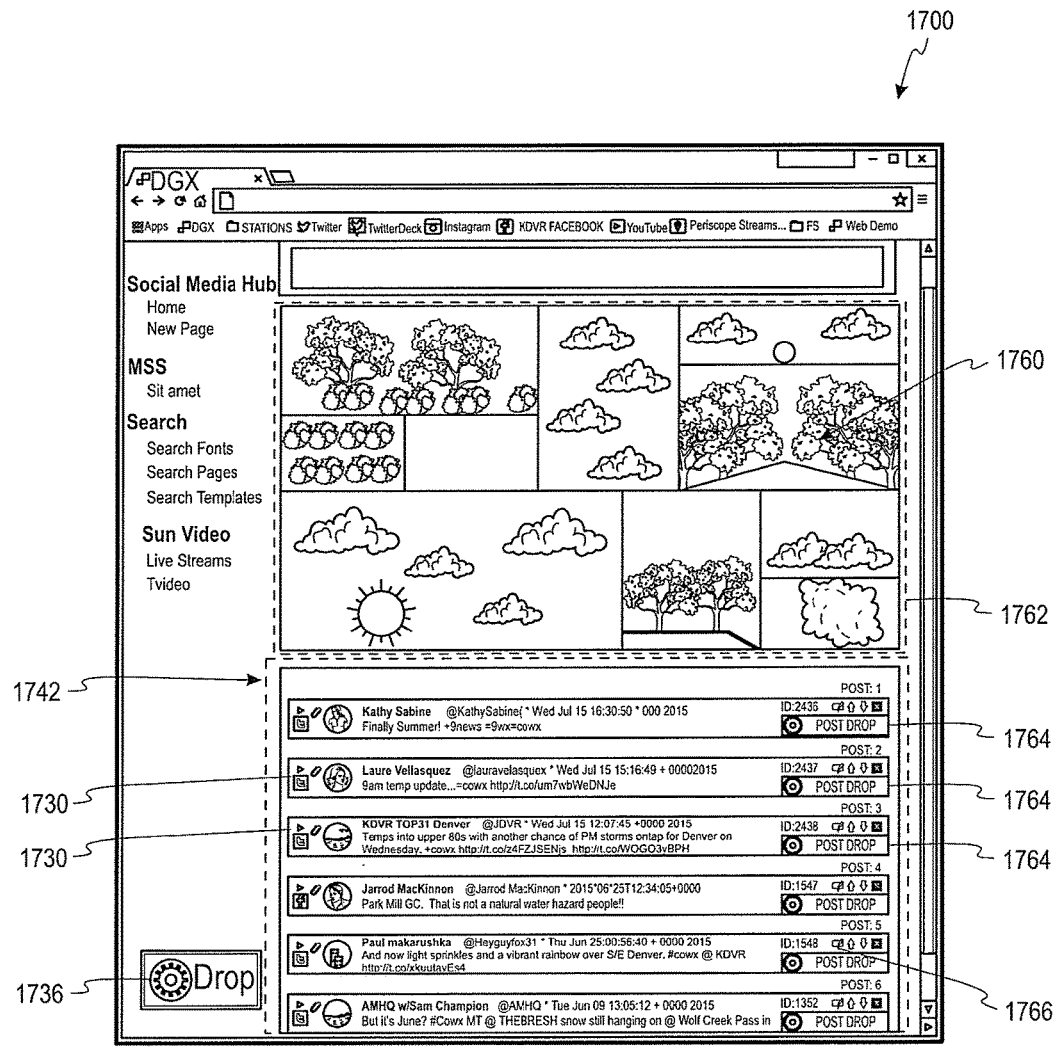
FIG. 17 is a simplified illustration of an example user interface of a SM system.

FIG. 17 illustrates an example graphical user interface 1700 including a template 1760 populated with images corresponding to SM content items 1730. The user interface 1700 can also include a list 1742 having multiple slots populated with the SM content items 1730. In some aspects, each image location in the template can be associated with a respective slot on the list 1742. As such, the image displayed in a particular location in the template can be the image of the SM content item occupying the slot associated with that location.

As shown in FIG. 17, each slot includes a respective drop-target object 1764 to facilitate selecting a SM content item for that slot on the list 1742. Further, each drop-target object 1764 (and, thus, each slot) is associated with a different, respective record location in a SMS database.

In one aspect, the drop-target objects 1764 can be utilized to add SM content items from a web browser application, for example, as described above with respect to FIGS. 6 to 7C. Accordingly, each drag-and-drop input received by SM system 308 stores a record in the SMS database, populates the list with information for the selected SM content item, and populates the template with an image. In this way, the list, the template, and the SMS database can be populated with a SM content item at the same time. In the event that a new SM content item is dragged-and-dropped to a slot that already includes another SM content item, SM system 308 can replace the other SM content item with the new SM content item in the slot and overwrite the associated record in the SMS database with the data of the new SM content item. In another aspect, the drop-target objects 1764 can be utilized to add SM content items already stored in the SMS database.

The example user interface 1700 also includes a drop-target object 1736 that functions in the same manner as described above with respect to the drop-target object 636 in FIG. 6. That is, responsive to the user dragging and dropping a SM content item on the drop-target object 1736, the SM data obtained for the SM content item can be stored dynamically stored in an available storage location within the SMS database.

The user interface of SM system 308 can include a preview window 1762 that displays a selected template populated with one or more selected SM content items. In this way, a user can determine how the SM content item(s) will appear when integrated into the video program and determine whether any modifications should be made. In some instances, it may not be appropriate or desirable to integrate an entire SM content item into the video program. For example, the text obtained for the SM content item can include a URL that the user may wish to omit to provide a cleaner presentation of the SM content item during the video program. As another example, the text of the SM content item may include vulgarities or personal information that the user may wish to omit from the video program.

Figure 18:
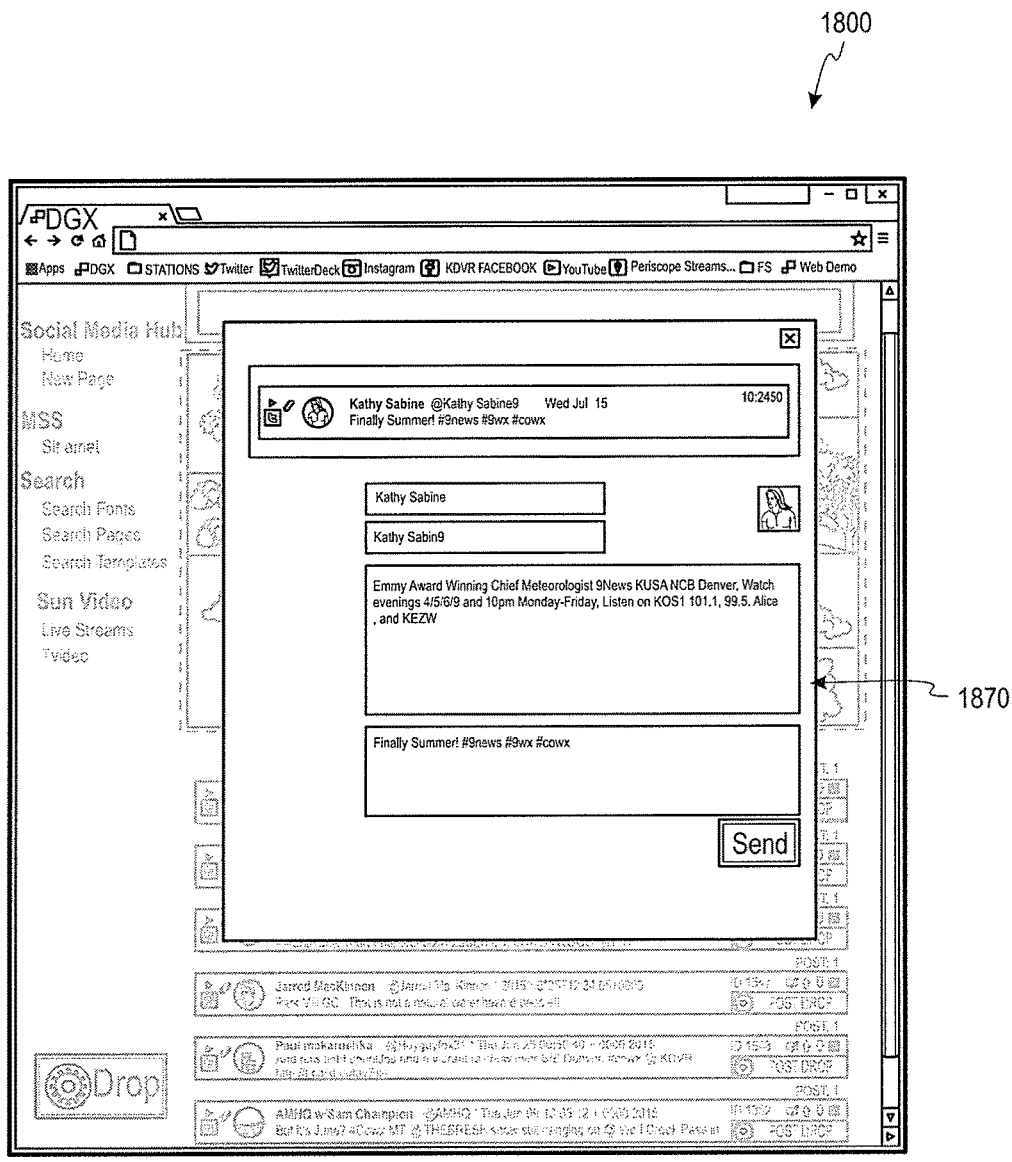
FIG. 18 is simplified illustration of another example user interface of a SM system.

The user interface of SM system 308 can facilitate modifying one or more aspects of a SM content item. In one example implementation, the user interface can display a list of SM content items that have been selected for integration into the video program (e.g., the list 642 in FIG. 6 and/or the list 1742 in FIG. 17). In this example, for each of the listed SM content items, the user interface can also include an edit button 1766. When the edit button 1766 is selected for a particular SM content item, the SM system 308 can provide one or more editable data fields displaying the data stored in the SMS database for that SM content item. An example user interface 1800 providing editable data fields 1870 is illustrated in FIG. 18.

To modify the text associated with a particular SM content item, the user can modify the text displayed in an editable text field of the user interface for that SM content item. Responsive to the user modifying the text in the user interface, SM system 308 can automatically modify the corresponding data stored in the SMS database in a consistent manner. In other examples, other aspects of the SM content item (e.g., videos, images, or audio files) can be modified via the user interface to cause SM system 308 to modify corresponding data stored in the SMS database. In some examples, any modifications to the SM content item can be shown in real-time in the preview window 1762 of the user interface for SM system 308.

Typically, SM platforms provide data for SM content items in a common web browser file format such as, for example, HTML, HTML5, or JavaScript. On the other hand, one or more components of the VPS 202 can utilize an entirely different file format to playout videos, text, or images. SM system 308 can facilitate integrating SM content items into the video program, at least in part, by handling these formatting differences. For example, SM system 308 can include a CG that (i) displays a SM content item in its native web browser file format in the preview window of the user interface but (ii) reformats the SM content items to a standard broadcast format for display in the video program. Such a CG allows the data obtained for a SM content item to be stored in the SMS database in the format in which it is received from the SM platform. Because the SM content item does not need to be reformatted until the SM content item is ready to be integrated into the video program, SM system 308 can reduce the processing workload and time for preparing the SM content item.

C. Example SM Content Item Integration

Once a SM content item is obtained and prepared, SM system 308 can facilitate integrating the SM content item into the video program in various ways. According to some aspects, a SM content item can be integrated into the video program via a video camera. In practice, a SM content item can be displayed on a display device located within the field of view of the video camera (e.g., on a set where filming occurs for the video program). For example, the SM content item can be displayed on a touch screen device, which allows an on-air presenter to interact with the SM content item. To facilitate the presenter's interactions with the SM content item, SM system 308 can be programmed with instructions that cause predefined actions in response to predetermined touch commands.

In one example, the touch screen can initially display multiple small tiles, each representing a different SM content item. In this example, the SM content items can relate to weather conditions captured in photographs published on SM platforms by various different publishers. As such, each tile can display a different photograph. The position and ordering of the small tiles can be determined by a template selected for the display of the SM content items. The selected template can also include programming instructions that allows the commands provided via the touch screen display to cause predefined actions for the displayed SM content items. For example, if a meteorologist taps on one of the small items a first time, the programming instructions can cause the tile to expand so as to enlarge the photograph and perhaps display additional information associated with the SM content item (e.g., a username, time, location, and/or text published in connection with the SM content item). Other commands can cause an expanded tile to return to its initial size and position in this example. As the meteorologist interacts with the SM content items displayed on the touch screen, a camera can generate a video output including these interactions and thereby integrate the SM content items into the video program.

In some examples, a SM content item can be integrated into the video program via DVE system 304 executing a DVE. To do so, SM system 308 can facilitate integrating a selected template and a SM content item into the program schedule maintained by the scheduling system 310. The program schedule can include multiple Media Object Server Communication Protocol ("MOS Protocol") objects that collectively define various content items and actions scheduled to occur for the video program. To facilitate integration of the template and the SM content item, SM system 308 can facilitate transforming the selected template and SM content item into a MOS object. In practice, this can be achieved by creating a record in a scheduling database having appropriate MOS protocol fields populated by references to the SM fields in the SMS database. In one example implementation, SM system 308 can create the record in the scheduling database in response to the user dragging-and-dropping a selectable object in the user interface of the SM system into the scheduling system. Other example mechanisms for creating a MOS object based on SM content items are also contemplated.

The MOS object can include programming instructions that correspond to a sequence for playing out multiple states of the SM content items and the template. Based on such instructions, sequencing system 306 can be employed to step through the different states (e.g., in response to a user provided input).

The SM content item and the template also can be integrated into the video program via a DVE system of the video-broadcast system 204. In this context, the SM content item can be integrated in a manner that persistently displays the SM content item even if the video program is not being broadcasted (e.g., during commercial breaks). For example, such implementations can be utilized to display SM content items related to amber alerts, severe weather warnings, and/or public safety advisories.

IV. Example Variations

Although some of the acts and/or functions described in this disclosure have been described as being performed by a particular entity, such acts and/or functions can be performed by any entity, such as those described in this disclosure. Further, although the described acts and/or functions have been recited in a particular order, the acts and/or functions need not be performed in the order recited. However, in some instances, it can be desired to perform the acts and/or functions in the order recited. Also, not all of the described acts and/or functions need to be performed to achieve one or more of the benefits provided by this disclosure, and therefore not all acts and/or functions are required.

Although some of the acts and/or functions described in this disclosure have been described as being performed by a particular entity, the acts and/or functions can be performed by any entity, such as those entities described in this disclosure. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required.

Although certain variations have been discussed in connection with one or more example of this disclosure, such variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

We claim:

1. A method comprising:
    accessing, by a computing system, a social media (SM) platform; selecting, by the computing system, a SM content item published on the SM platform; responsive to selecting the SM content item, the computing system receiving an account identifier and a timestamp each corresponding to the selected SM content item;

using, by the computing system, the received account identifier and timestamp to retrieve the SM content item from the SM platform, wherein using the received account identifier and timestamp to retrieve the SM content item comprises:
accessing a webpage corresponding to the received account identifier on the SM platform, wherein the webpage comprises a plurality SM content items each having a corresponding timestamp on the webpage,
identifying, using the received timestamp, the SM content item on the webpage,
wherein identifying the selected SM content item on the webpage comprises:
(i) identifying one timestamp on the webpage that matches the received timestamp, and
(ii) identifying, as the selected SM content item, the SM content item on the webpage corresponding to the identified timestamp on the webpage matching the received timestamp, and retrieving the identified SM content item from the webpage; and
integrating, by the computing system, the retrieved SM content item into a video program.

2. The method of claim 1, wherein the account identifier identifies a publisher of the SM content item on the SM platform and the timestamp indicates a time of publication of the SM content item on the SM platform.

3. The method of claim 1, wherein retrieving the identified SM content item on the webpage comprises the computing system screen-scraping the webpage to (i) identify data corresponding to the identified SM content item and (ii) copy the identified data into a data storage unit of the computing system.

4. The method of claim 1, wherein the computing system indirectly accesses the SM platform via a SM dashboard application, and wherein the computing system selects the SM content item via the SM dashboard application.

5. The method of claim 1, further comprising:
responsive to selecting the SM content item, the computing system receiving a platform identifier indicating the SM platform on which the SM content item is published,
wherein accessing the webpage comprises:
(i) determining a uniform resource locator (URL) based on the received account identifier and the platform identifier, and
(ii) using the determined URL to access the webpage.

6. The method of claim 5, wherein determining the URL comprises:
determining a domain name based on the received platform identifier;
determining a file path based on the received account identifier; and
determining the URL using the determined domain name and the determined file path.

7. The method of claim 1, wherein selecting the SM content item comprises dragging and dropping an object associated with the SM content item.

8. The method of claim 7, wherein accessing the SM platform comprises accessing the SM platform via a web browser application, and the method further comprises:
displaying the web browser application in a first application window of a user interface; and
displaying a drop-target object in a second application window of the user interface,
wherein dragging and dropping the object comprises (i) dragging the object from the first application window to the drop-target object displayed in the second application window and (ii) dropping the object on the drop-target object.

9. The method of claim 7, wherein the SM content item comprises an image and the object is the image.

10. The method of claim 1, wherein the retrieved SM content item comprises at least an image of the SM content item, text of the SM content item, and a profile picture associated with a publisher of the SM content item on the SM platform.

11. The method of claim 1, wherein integrating the retrieved SM content item comprises executing a digital-video effect (DVE).

12. The method of claim 1, wherein the received timestamp indicates a time at which the selected SM content item was published on the SM platform.

13. The method of claim 1, wherein each timestamp corresponding to an SM content item of the plurality of SM content items on the webpage indicates a time differential between a time at which the computing system accessed the webpage and the time at which the SM platform published the SM content item, and wherein identifying the one timestamp on the webpage that matches the received timestamp comprises determining the time differential for the one timestamp.

14. The method of claim 1, further comprising determining that the SM platform does not provide an Application Programming Interface (API) for requesting the SM content item,
wherein using the received account identifier and timestamp to retrieve the SM content item from the SM platform comprises using the received account identifier and timestamp to retrieve the SM content item from the SM platform responsive to determining that the SM platform does not provide the API for requesting the SM content item.

15. The method of claim 1, further comprising:
performing a comparison of a timestamp corresponding to the retrieved SM content item to timestamp information stored in a cache storage for one or more previously retrieved SM content items;
determining, based on the comparison of the timestamp to the timestamp information, that the retrieved SM content item was previously stored in the cache storage; and
responsive to determining that the SM content item was not previously stored in the cache storage, storing the SM content item in the cache storage.

16. A non-transitory computer-readable medium having stored thereon, program instructions that when executed by a processor, cause a computing system to perform a set of acts comprising:
accessing, by the computing system, a social media (SM) platform;
selecting, by the computing system, a SM content item published on the SM platform;
responsive to selecting the SM content item, the computing system receiving an account identifier and a timestamp each corresponding to the selected SM content item; and
using, by the computing system, the received account identifier and timestamp to retrieve the SM content item from the SM platform, wherein using the received account identifier and timestamp to retrieve the SM content item comprises:
accessing a webpage corresponding to the received account identifier on the SM platform, wherein the webpage comprises a plurality SM content items each having a corresponding timestamp on the webpage, identifying, using the received timestamp, the SM content item on the webpage, wherein identifying the selected SM content item on the webpage comprises:
(i) identifying one timestamp on the webpage that matches the received timestamp, and
(ii), identifying, as the selected SM content item, the SM content item on the webpage corresponding to the identified timestamp on the webpage matching the received timestamp, and retrieving the identified SM content item from the webpage.

17. The non-transitory computer-readable medium of claim 16, wherein the set of acts further comprises integrating the retrieved SM content item into a video program.

18. The non-transitory computer-readable medium of claim 16, wherein retrieving the identified SM content item on the webpage comprises screen-scraping the webpage to (i) identify data corresponding to the identified SM content item and (ii) copy the identified data into a data storage unit of the computing system.

19. The non-transitory computer-readable medium of claim 18, wherein accessing the SM platform includes accessing the SM platform via a web browser application, and the set of acts further comprises:
displaying the web browser application in a first application window of a user interface; and
displaying a drop-target object in a second application window of the user interface,
wherein dragging and dropping the object includes (i) dragging the object from the first application window to the drop-target object displayed in the second application window and (ii) dropping the object on the drop-target object.

20. The non-transitory computer-readable medium of claim 16, wherein selecting the SM content item comprises dragging and dropping an object associated with the SM content item.

21. A computing system comprising a processor and a memory having program instructions stored thereon that, when executed by the processor, cause the computing system to perform a set of acts comprising:
accessing, by the computing system, a social media (SM) platform;
selecting, by the computing system, a SM content item published on the SM platform;
responsive to selecting the SM content item, the computing system receiving an account identifier and a timestamp each corresponding to the selected SM content item; and
using, by the computing system, the received account identifier and timestamp to retrieve the SM content item from the SM platform, wherein using the received account identifier and timestamp to retrieve the SM content item comprises:
accessing a webpage corresponding to the received account identifier on the SM platform, wherein the webpage comprises a plurality SM content items each having a corresponding timestamp on the webpage,
identifying, using the received timestamp, the SM content item on the webpage, wherein identifying the selected SM content item on the webpage comprises:
(i) identifying one timestamp on the webpage that matches the received timestamp, and
(ii) identifying, as the selected SM content item, the SM content item on the webpage corresponding to the identified timestamp on the webpage matching the received timestamp, and
retrieving the identified SM content item from the webpage.

* * * * *